(12) United States Patent
Aoki et al.

(10) Patent No.: US 10,946,853 B2
(45) Date of Patent: Mar. 16, 2021

(54) DRIVE FORCE CONTROL SYSTEM FOR HYBRID VEHICLES

(71) Applicant: Toyota Jidosha Kabushiki Kaisha, Toyota (JP)

(72) Inventors: Kazuma Aoki, Sunto-gun (JP); Tatsuya Imamura, Okazaki (JP); Yasuhiro Oshiumi, Gotemba (JP); Yukari Okamura, Gotemba (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 309 days.

(21) Appl. No.: 16/187,001

(22) Filed: Nov. 12, 2018

(65) Prior Publication Data

US 2019/0143959 A1 May 16, 2019

(30) Foreign Application Priority Data

Nov. 13, 2017 (JP) .............................. JP2017-218579

(51) Int. Cl.
*B60W 20/14* (2016.01)
*B60W 10/06* (2006.01)
(Continued)

(52) U.S. Cl.
CPC .............. *B60W 20/14* (2016.01); *B60K 6/442* (2013.01); *B60K 6/445* (2013.01); *B60W 10/06* (2013.01);
(Continued)

(58) Field of Classification Search
CPC ...... B60W 20/14; B60W 20/10; B60W 20/20; B60W 10/06; B60W 10/08; B60W 10/26;
(Continued)

(56) References Cited

U.S. PATENT DOCUMENTS

| 5,637,987 A | * | 6/1997 | Fattic ..................... B60K 6/387 |
| | | | 322/40 |
| 5,791,427 A | * | 8/1998 | Yamaguchi ........... B60W 10/18 |
| | | | 180/65.235 |

(Continued)

FOREIGN PATENT DOCUMENTS

| JP | 2009126479 A | * | 6/2009 |
| JP | 2015016782 A | * | 1/2015 |

(Continued)

OTHER PUBLICATIONS

Jonathan et al., "Ideal Regenerative Braking Torque in Collaboration with Hydraulic Brake System," 2017, Publisher: IEEE.*

(Continued)

*Primary Examiner* — Tuan C To
(74) *Attorney, Agent, or Firm* — Sughrue Mion, PLLC

(57) ABSTRACT

A control system for hybrid vehicles to prevent a reduction in a brake force when an electrical input to a battery is restricted. A controller is configured to execute a regeneration control to deliver a regenerative torque resulting from operating second motor as a generator to the drive wheels, and an engine brake control to deliver a brake torque resulting from a power loss of an engine to the output (Continued)

member. The controller is further configured to select an HV-Lo mode when an input power allowed to accumulate in the battery is smaller than a threshold power.

14 Claims, 21 Drawing Sheets

(51) Int. Cl.
| | |
|---|---|
| *B60W 10/08* | (2006.01) |
| *B60W 30/18* | (2012.01) |
| *B60K 6/445* | (2007.10) |
| *B60W 20/10* | (2016.01) |
| *B60W 10/26* | (2006.01) |
| *B60K 6/442* | (2007.10) |
| *B60W 20/20* | (2016.01) |

(52) U.S. Cl.
CPC ............ *B60W 10/08* (2013.01); *B60W 10/26* (2013.01); *B60W 20/10* (2013.01); *B60W 20/20* (2013.01); *B60W 30/18127* (2013.01); *B60W 30/18136* (2013.01); *B60W 2510/244* (2013.01); *B60W 2510/246* (2013.01); *B60W 2520/10* (2013.01); *B60W 2710/0605* (2013.01); *B60W 2710/0627* (2013.01); *B60W 2710/0633* (2013.01); *B60W 2710/0644* (2013.01); *B60W 2710/081* (2013.01); *B60W 2710/083* (2013.01); *B60W 2710/086* (2013.01); *B60W 2710/244* (2013.01); *B60W 2710/248* (2013.01); *B60Y 2200/92* (2013.01)

(58) Field of Classification Search
CPC ..... B60W 30/18127; B60W 30/18136; B60W 2510/244; B60W 2510/246; B60W 2520/10; B60W 2710/0605; B60W 2710/0627; B60W 2710/0633; B60W 2710/0644; B60W 2710/081; B60W 2710/083; B60W 2710/086; B60W 2710/244; B60W 2710/248; B60K 6/442; B60K 6/445; B60Y 2200/92
USPC .......................................................... 701/22
See application file for complete search history.

(56) References Cited

U.S. PATENT DOCUMENTS

| | | | | |
|---|---|---|---|---|
| 5,839,533 | A | * | 11/1998 | Mikami ................ B60W 10/06 180/165 |
| 5,934,395 | A | * | 8/1999 | Koide .................... B60L 50/16 180/65.235 |
| 6,048,289 | A | * | 4/2000 | Hattori .................. B60W 10/10 477/15 |
| 9,327,718 | B2 | | 5/2016 | Itagaki |
| 2004/0046448 | A1 | * | 3/2004 | Brown .................. B60K 6/365 303/152 |
| 2005/0189894 | A1 | * | 9/2005 | Komiyama ........... B60L 15/025 318/376 |
| 2008/0120001 | A1 | | 5/2008 | Heap |
| 2009/0043437 | A1 | * | 2/2009 | Shiino ............. B60W 30/18109 701/22 |
| 2009/0118887 | A1 | * | 5/2009 | Minarcin .................. B60L 7/26 701/22 |
| 2011/0118920 | A1 | * | 5/2011 | Kim ...................... B60W 10/11 701/22 |
| 2013/0173099 | A1 | * | 7/2013 | Takagi .................... B60K 6/52 701/22 |
| 2013/0244829 | A1 | * | 9/2013 | Nefcy .................... B60W 10/11 477/15 |
| 2016/0251011 | A1 | | 9/2016 | Hata |
| 2016/0368361 | A1 | | 12/2016 | Endo et al. |
| 2017/0274754 | A1 | | 9/2017 | Imamura et al. |

FOREIGN PATENT DOCUMENTS

| | | | | |
|---|---|---|---|---|
| JP | 2015020485 A | * | 2/2015 | |
| JP | 2017-007437 A | | 1/2017 | |
| WO | WO-2013150966 A1 | * | 10/2013 | ............... B60K 6/48 |

OTHER PUBLICATIONS

Xiangpeng et al., "Regenerative Braking Torque Estimation and Control Approaches fora Hybrid Electric Truck," 2010, Publisher: IEEE.*

S.M. Reza, "Anti-Lock Regenerative Braking Torque Control Strategy for Electric Vehicle," 2016, Publisher: IEEE.*

* cited by examiner

Fig. 4

| Operating Mode | | CL1 | CL2 | B1 | MG1 | MG2 | ENG |
|---|---|---|---|---|---|---|---|
| HV Mode | HV-Lo Mode | ● | – | – | G | M | ON |
| | HV-Hi Mode | – | ● | – | G | | ON |
| | Fixed Mode | ● | ● | – | | M | ON |
| EV Mode | Dual-Motor Mode EV-Lo Mode | – | – | ● | M | M | OFF |
| | Dual-Motor Mode EV-Hi Mode | – | ● | ● | M | M | OFF |
| | Single-Motor Mode | – | – | – | | M | OFF |

DRIVE FORCE CONTROL SYSTEM FOR HYBRID VEHICLES

CROSS-REFERENCE TO RELATED APPLICATIONS

The present disclosure claims the benefit of Japanese Patent Application No. 2017-218579 filed on Nov. 13, 2017 with the Japanese Patent Office, the disclosures of which are incorporated herein by reference in its entirety.

BACKGROUND

Field of the Disclosure

Embodiments of the present disclosure relate to the art of a drive force control system for a hybrid vehicle, in which a differential mechanism is connected to an engine and a first motor, and in which a second motor is connected to an output member of the differential mechanism and the first motor.

Discussion of the Related Art

JP-A-2017-007437 describes a drive unit for a hybrid vehicle in which an output torque of an engine is distributed to a first motor and to an output side through a power split mechanism, and in which an output torque of a second motor driven by electricity supplied from the first motor is synthesized with the engine torque. In the drive unit taught by JP-A-2017-007437, the power split mechanism is adapted to establish a low mode in which a ratio of the power delivered to the output side to the power delivered to the first motor is relatively large, and a high mode in which the above-mentioned ratio is relatively small.

During deceleration in the vehicle taught by JP-A-2017-007437, not only an engine brake torque established by a friction torque and a pumping loss of the engine, but also a brake torque established by the second motor may be applied to the drive wheels. Here, a magnitude of the engine brake torque is changed depending on an engine speed.

A speed of the engine may be restricted to limit damage on rotary members of the power split mechanism, and a limit speed of the engine in the low mode is lower than that in the high mode. If the engine speed is thus restricted, a maximum engine brake torque is restricted. That is, in the low mode, the maximum engine brake torque is weaker than that in the high mode.

However, in the low mode, a ratio of the torque delivered to the output side is larger than that in the high mode, and hence the large torque may be delivered to the output side even if the engine brake torque is restricted. That is, if it is possible to establish a sufficiently large brake torque by the second motor, the braking force may be increased by shifting the mode from the high mode to the low mode.

When the second motor is operated to establish the brake torque, the second motor serves as a generator. On the other hand, when the first motor is operated to maintain the engine speed within the limit speed, the first motor may serve not only as a motor but also as a generator depending on a rotational direction and a torque direction. Consequently, a total electric power of an electric consumption of the first motor (or an electric power generated by the first motor) and an electric power generated by the second motor is outputted from a battery or accumulated in the battery. That is, if the electric power possible to be accumulated in the battery is restricted, the brake torque generated by the second motor is restricted. As described, the limit speed of the engine in the low mode is lower than that in the high mode, and hence a speed of the first motor may be reduced in the low mode. Consequently, an electric consumption of the first motor may be reduced thereby restricting the brake torque of the second motor. That is, if the electric power possible to be accumulated in the battery is restricted, the brake torque of the second motor in the low mode may be smaller than that in the high mode. For this reason, a maximum brake force may be reduced by the restriction of the electric power possible to be accumulated in the battery if the mode is shifted between the low mode and the high mode based on a specific condition.

SUMMARY

Aspects of embodiments of the present disclosure have been conceived noting the foregoing technical problems, and it is therefore an object of the present disclosure is to provide a control system for controlling a hybrid vehicle to prevent a reduction in a maximum brake force when an electrical input to a battery is restricted for some reason.

The drive force control system according to the embodiment of the present disclosure is applied to a hybrid vehicle, comprising: an engine; a first rotary machine that serves not only as a motor but also as a generator; a transmission mechanism that distributes an output torque of the engine to the first rotary machine side and an output member side, wherein an operating mode can be selected from a first mode in which a ratio of the output torque of the engine delivered to the output member side to a torque of the engine is set to a first predetermined ratio, and a second mode in which a ratio of the output torque of the engine delivered to the output member side to a torque of the engine is set to a second predetermined ratio that is smaller than the first predetermined ratio; a battery; and a second rotary machine that serves not only as a motor but also as a generator, and that is connected electrically to the first rotary machine. In order to achieve the above-explained objective, according to the embodiment of the present disclosure, the control system is provided with a controller to control the transmission mechanism. Specifically, the controller is configured to: execute a regeneration control to deliver a regenerative torque resulting from operating the second rotary machine as a generator to the drive wheels, and an engine brake control to deliver a brake torque resulting from a power loss of the engine to the output member; maintain a rotational speed of the engine to a predetermined speed during execution of the engine brake control by operating the first rotary machine as a motor or a generator; and restrict selection of the first mode when an input power allowed to accumulate in the battery is smaller than a threshold power.

In a non-limiting embodiment, the controller may be further configured to: maintain the rotational speed of the engine to the predetermined speed during execution of the engine brake control by operating the first rotary machine as a motor; and supply an electric power calculated by subtracting an electric power consumed by the first rotary machine from an electric power generated by the second rotary machine during execution of the regeneration control to the battery.

In a non-limiting embodiment, the engine may comprise an intake pipe that introduces ambient air to the engine, and a throttle valve that controls a flow rate of the air flowing through the intake pipe. In addition, the engine brake control may include a control to establish the brake torque by stopping fuel supply to the engine while controlling the throttle valve in such a manner as to reduce the flow rate of the air flowing through the intake pipe.

In a non-limiting embodiment, the controller may be further configured to establish a maximum brake force in the vehicle by maintaining the rotational speed of the engine to an upper limit speed by the first rotary machine, while controlling the regenerative torque of the second motor based on the input power allowed to accumulate in the battery.

In a non-limiting embodiment, the threshold power may include the input power allowed to accumulate in the battery, that is possible to reduce the maximum brake force in the first mode smaller than the maximum brake force in the second mode.

In a non-limiting embodiment, the threshold power may be reduced with an increase in the brake torque.

In a non-limiting embodiment, the brake torque may be increased with an increase in the rotational speed of the engine. In addition, the upper limit speed of the engine in the first mode may be set to be lower than the upper limit speed of the engine in the second mode.

In a non-limiting embodiment, the controller may be further configured to control the first rotary machine in such a manner as to generate a larger amount of the electric power when maintaining the rotational speed of the engine to the upper limit speed in the first mode, in comparison with an amount of the electric power generated by the first rotary machine when maintaining the rotational speed of the engine to the upper limit speed in the second mode.

In a non-limiting embodiment, the transmission may comprise a plurality of rotary elements. In addition, the upper limit speed of the engine may be raised with an increase in an upper limit speed of a predetermined rotary element in the rotary elements.

In a non-limiting embodiment, the upper limit speed of the predetermined rotary element may be lowered with a temperature rise of the predetermined rotary element. In addition, the upper limit speed of the predetermined rotary element may be raised with an increase in an amount of lubricant supplied to the predetermined rotary element.

In a non-limiting embodiment, the controller may be further configured to restrict the selection of the first mode when a vehicle speed is higher than a predetermined speed.

In a non-limiting embodiment, the controller may be further configured to execute a cancellation control to cancel the restriction of selection of the first mode by increasing the input power allowed to accumulate in the battery during restricting the selection of the first mode.

In a non-limiting embodiment, the input power allowed to accumulate in the battery may be restricted when a temperature of the battery is raised higher than a predetermined temperature, and the drive force controlling system for a hybrid vehicle may further comprise a cooling device. In addition, the cancellation control may include a control to cool the battery by the cooling device more promptly during restricting the selection of the first mode, in comparison with a case in which the selection of the first mode is not restricted.

In a non-limiting embodiment, the controller may be further configured to: select an operating mode of the hybrid vehicle from a hybrid mode in which the hybrid vehicle is powered by the engine and the second rotary machine, and an electric vehicle mode in which the hybrid vehicle is powered by the second rotary machine without using the engine; and start the engine when a required power is greater than a predetermined power. In addition, the cancellation control may include a control to increase the predetermined power when the selection of the first mode is restricted, in comparison with a case in which the selection of the first mode is not restricted.

Thus, according to the embodiment of the present disclosure, the operating mode of the transmission can be selected from the first mode in which the output torque of the engine is delivered to the output member side at a first predetermined ratio, and the second mode in which the output torque of the engine is delivered to the output member side at the second predetermined ratio that is smaller than the first predetermined ratio. In addition, the controller is configured to execute the engine brake control to deliver a brake torque resulting from a power loss of the engine to the output member. According to the embodiment, therefore, a large brake torque may be applied to the output member through the transmission by selecting the first mode. Moreover, the controller is further configured to execute the regeneration control to deliver a regenerative torque resulting from operating the second rotary machine as a generator to the drive wheels. According to the embodiment, therefore, the maximum brake force applied to the hybrid vehicle may be increased by selecting the first mode, when a sufficient amount of the input power may be accumulated in the battery. By contrast, when the input power allowed to accumulate in the battery is smaller than the threshold power, the electric power consumed by the first rotary machine to maintain the rotational speed of the engine to the predetermined speed is reduced, or the electric power generated by the first rotary machine is increased. In this case, therefore, an amount of the electric power regenerated by the second rotary machine would be reduced in accordance with the input power allowed to accumulate in the battery. In this situation, if the first mode is selected, the maximum brake force will be reduced significantly. In order to prevent such reduction in the maximum brake force, according to the embodiment, the controller is configured to restrict the selection of the first mode in such situation.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

FIG. 4 is a table showing engagement states of engagement devices and operating conditions of the prime movers in each operating mode;

DETAILED DESCRIPTION OF THE PREFERRED EMBODIMENT(S)

Figure 1:
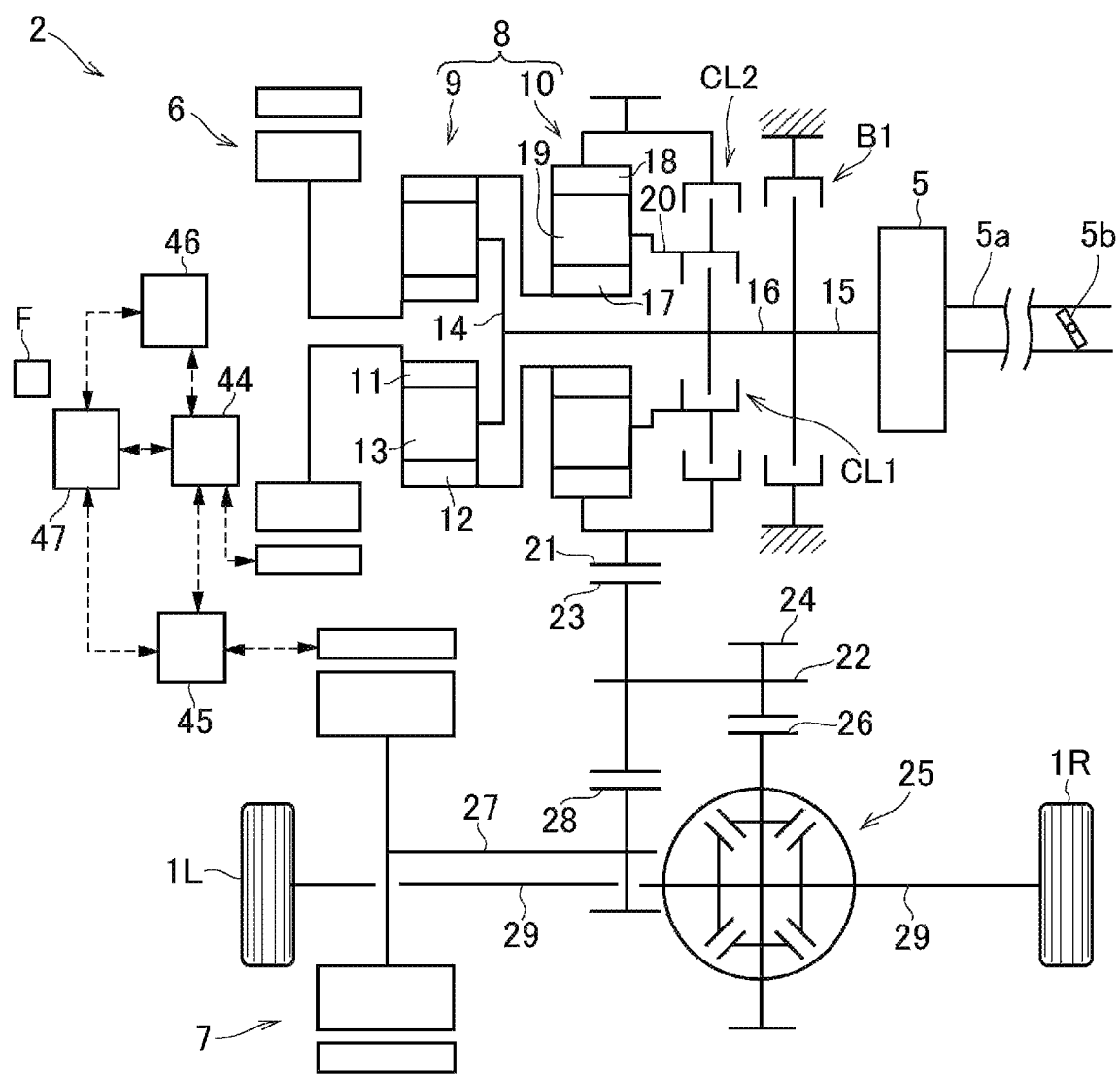
FIG. 1 is a skeleton diagram showing a first drive unit of the hybrid vehicle according to at least one embodiment of the present disclosure.
Figure 2:
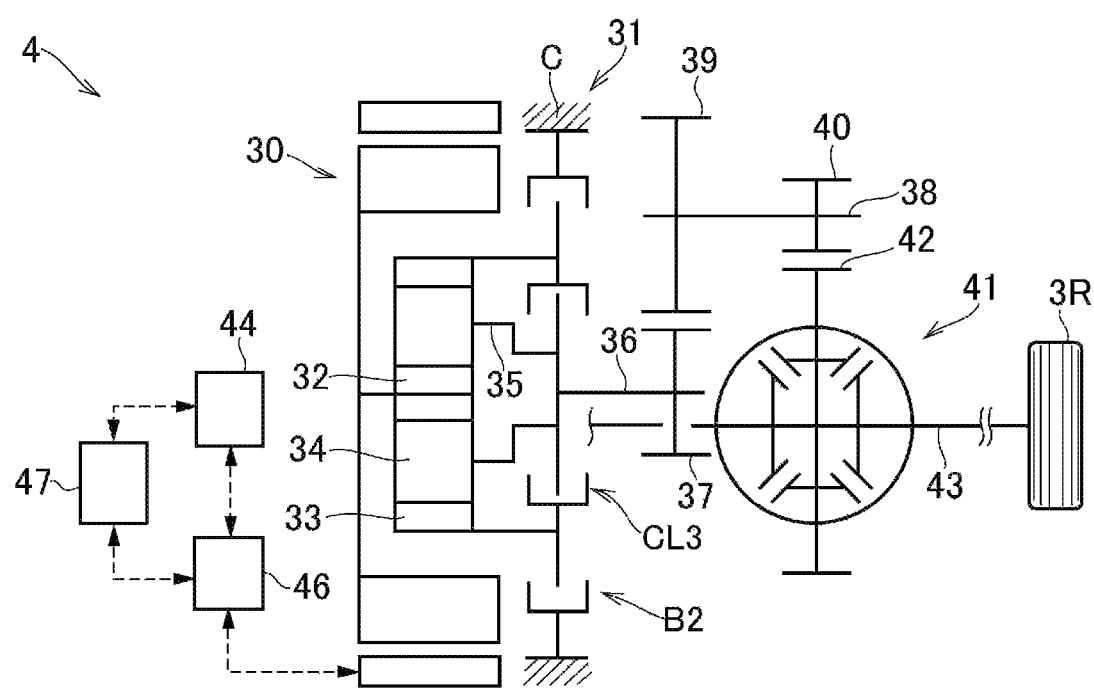
FIG. 2 is a skeleton diagram showing a second drive unit of the hybrid vehicle according to at least one embodiment of the present disclosure.

Preferred embodiments of the present application will now be explained with reference to the accompanying drawings. Referring now to FIGS. 1 and 2, there are shown the first embodiment of the hybrid vehicle according to the present disclosure. Specifically, FIG. 1 shows a first drive unit 2 that drives a pair of front wheels 1R and 1L, and FIG. 2 shows a second drive unit 4 that drives a pair of rear wheels 3R and 3L. The hybrid vehicle is provided with an engine 5, a first motor 6 and a second motor 7. Specifically, the first motor 6 is a motor-generator having a generating function (abbreviated as "MG1" in the drawings). In the hybrid vehicle according to the first embodiment, a speed of the engine 5 is controlled by the first motor 6, and the second motor 7 is driven by electric power generated by the first motor 6 to generate a drive force for propelling the vehicle. Optionally, the second motor 7 (abbreviated as "MG2" in the drawings) may also be used as the motor-generator having a generating function. In the hybrid vehicle, accordingly, first motor 6 serves as a first rotary machine.

The engine 5 comprises an intake pipe 5a that introduces ambient air to the engine 5, and a throttle valve 5b that controls an opening area of the intake pipe 5a to control air intake to the engine 5. Specifically, an opening degree of the throttle valve 5b is adjusted in accordance with a required output torque and a required engine brake force of the engine 5. For example, a pumping loss of the engine 5 is increased thereby increasing the engine brake force with a reduction in the opening degree of the throttle valve 5b.

A power split mechanism 8 as a transmission is connected to the engine 5. The power split mechanism 8 includes a power split section 9 that distributes the engine torque to the first motor 6 side and to an output side, and a transmission section 10 that alters a torque split ratio.

For example, a single-pinion planetary gear unit adapted to perform differential action among three rotary elements may be used as the power split section 9. Specifically, the power split section 9 comprises: a sun gear 11; a ring gear 12 as an internal gear arranged concentrically with the sun gear 11; pinion gears 13 interposed between the sun gear 11 and the ring gear 12 while being meshed with both gears 11 and 12; and a carrier 14 supporting the pinion gears 13 in a rotatable manner. In the power split section 9, accordingly, the sun gear 11 serves mainly as a reaction element, the ring gear 12 serves mainly as an output element, and the carrier 14 serves mainly as an input element.

An output shaft 15 of the engine 5 is connected to an input shaft 16 of the power split mechanism 8 connected to the carrier 14 so that power of the engine 5 is applied to the carrier 14. Optionally, an additional gear unit may be interposed between the input shaft 16 and the carrier 14, and a damper device and a torque converter may be interposed between the output shaft 15 and the input shaft 16.

The sun gear 11 is connected to the first motor 6. In the embodiment shown in FIG. 1, the power split section 9 and the first motor 6 are arranged concentrically with a rotational center axis of the engine 5, and the first motor 6 is situated on an opposite side of the engine 5 across power split section 9. The transmission section 10 is interposed coaxially between the power split section 9 and the engine 5.

Specifically, the transmission section 10 is a single pinion planetary gear unit comprising: a sun gear 17; a ring gear 18 as an internal gear arranged concentrically with the sun gear 17; pinion gears 19 interposed between the sun gear 17 and the ring gear 18 while being meshed with both gears 17 and 18; and a carrier 20 supporting the pinion gears 19 in a rotatable manner. Thus, the transmission section 10 is also adapted to perform a differential action among the sun gear 17, the ring gear 18, and the carrier 20. In the transmission section 10, the sun gear 17 is connected to the ring gear 12 of the power split section 9, and the ring gear 18 is connected to an output gear 21.

In order to use the power split section 9 and the transmission section 10 as a complex planetary gear unit, a first clutch CL1 is disposed to selectively connect the carrier 20 of the transmission section 10 with the carrier 14 of the power split section 9. To this end, for example, a wet-type multiple plate clutch or a dog clutch may be used as the first clutch CL1. Thus, in the first drive unit 2 shown in FIG. 1, the power split section 9 is connected to the transmission section 10 to serve as a complex planetary gear unit by bringing the first clutch CL1 into engagement. In the complex planetary gear unit thus formed, the carrier 14 of the power split section 9 is connected to the carrier 20 of the transmission section 10 to serve as an input element, the sun gear 11 of the power split section 9 serves as a reaction element, and the ring gear 18 of the transmission section 10 serves as an output element.

A second clutch CL2 is disposed to rotate the rotary elements of the transmission section 10 integrally. For example, a friction clutch and a dog clutch may also be used as the second clutch CL2 to selectively connect the carrier 20 to the ring gear 18 or the sun gear 17, or to connect the sun gear 17 to the ring gear 18. In the first drive unit 2 shown in FIG. 1, specifically, the second clutch CL2 is adapted to connect the carrier 20 to the ring gear 18 to rotate the rotary elements of the transmission section 10 integrally. The first clutch CL1 and the second clutch CL2 are arranged coaxially with the engine 5, the power split section 9, and the transmission section 10 on the opposite side of the power split section 9 across the transmission section 10. The first clutch CL1 and the second clutch CL2 may be arranged not only in parallel to each other in a radial direction but also in tandem in an axial direction. In the first drive unit 2 shown in FIG. 1, the first clutch CL1 and the second clutch CL2 are arranged radially parallel to each other and hence an axial length of the drive unit can be shortened. In addition, since a width of the drive unit will not be widened by the clutches CL1 and CL2, the number of friction plates of the frictional clutch can be reduced.

A counter shaft 22 extends parallel to a common rotational axis of the engine 5, the power split section 9, and the transmission section 10. A driven gear 23 is fitted onto one end of the counter shaft 22 to be meshed with the output gear 21, and a drive gear 24 is fitted onto the other end of the counter shaft 22 to be meshed with a ring gear 26 of a differential gear unit 25 as a final reduction. The driven gear 23 is also meshed with a drive gear 28 fitted onto a rotor shaft 27 of the second motor 7 so that power or torque of the second motor 7 is synthesized with power or torque of the output gear 21 at the driven gear 23 to be distributed from the differential gear unit 25 to the front wheels 1R and 1L via each of the drive shafts 29.

In order to selectively stop a rotation of the output shaft 15 or the input shaft 16 for the purpose of delivering the drive torque generated by the first motor 6 to the front wheels 1R and 1L, a first brake B1 is arranged in the first drive unit 2. For example, a frictional engagement device or a dog brake may be used as the first brake B1. Specifically, the carrier 14 of the power split section 9 and the carrier 20 of the transmission section 10 are allowed to serve as reaction elements, and the sun gear 11 of the power split section 9 is allowed to serve as an input element by applying the first brake B1 to halt the output shaft 15 or the input shaft 16. To this end, the first brake B1 may be adapted to stop the rotation of the output shaft 15 or the input shaft 16 not only completely but also incompletely to apply a reaction torque to those shafts. Alternatively, a one-way clutch may be used instead of the first brake B1 to restrict a reverse rotation of the output shaft 15 or the input shaft 16.

The second drive unit 4 is mounted on the hybrid vehicle to deliver a power or a torque of a rear motor 30 to a pair of rear wheels 3R and 3L. Here, it is to be noted that the left rear wheel 3L is not illustrated in FIG. 2 for the sake of illustration. A motor-generator having a generating function may also be used as the rear motor 30 (abbreviated as "MGR" in the drawings), and the rear motor 30 is connected to a transmission 31. A gear stage of the transmission 31 may be selected from a speed reducing stage in which the torque of the rear motor 30 is multiplied, and a fixed stage in which the torque of the rear motor 30 is transmitted without being multiplied.

As shown in FIG. 2, the transmission 31 is a single-pinion planetary gear unit comprising: a sun gear 32; a ring gear 33 as an internal gear arranged concentrically with the sun gear 32; pinion gears 34 interposed between the sun gear 32 and the ring gear 33 while being meshed with both gears 32 and 33; and a carrier 35 supporting the pinion gears 34 in a rotatable manner.

In the transmission 31, the sun gear 32 is connected to the rear motor 30 to serve as an input element, and the carrier 35 is connected to an output shaft 36 to serve as an output element. In order to establish the fixed stage in the transmission 31, a third clutch CL3 is arranged in the second drive unit 4. For example, a friction clutch and a dog clutch may also be used as the third clutch CL3 to selectively connect the sun gear 32 to the ring gear 33 or the carrier 35, or to connect the ring gear 33 to the carrier 35. In the second drive unit 4 shown in FIG. 2, specifically, the third clutch CL3 is adapted to connect the ring gear 33 to the carrier 35 to establish the fixed stage in the transmission 31.

In order to establish the speed reducing stage in the transmission 31, a second brake B2 is arranged in the second drive unit 4. For example, a frictional engagement device or a dog brake may also be used as the second brake B2. Specifically, the second brake B2 stops a rotation of the ring gear 33 of the transmission 31 by engaging the ring gear 33 with a casing C holding the second drive unit 4 so that the ring gear 33 is allowed to serve as a reaction element. To this end, the second brake B2 may be adapted to stop the rotation of the ring gear 33 not only completely but also incompletely.

A drive gear 37 is fitted onto the output shaft 36 of the transmission 31, and a counter shaft 38 extends parallel to the output shaft 36. A driven gear 39 is fitted onto one end of the counter shaft 38 to be meshed with the drive gear 37. Specifically, the driven gear 39 is diametrically larger than the drive gear 37 so that an output torque of the transmission 31 is transmitted through the driven gear 39 while being multiplied. A drive gear 40 is fitted onto the other end of the counter shaft 38 to be meshed with a ring gear 42 of a differential gear unit 41 as a final reduction. The differential gear unit 41 is connected to driveshafts 43 to deliver the power of the rear motor 30 to the right rear wheel 3R and the left rear wheel 3L.

As shown in FIGS. 1 and 2, a first power control system 44 is connected to the first motor 6, a second power control system 45 is connected to the second motor 7, and a third power control system 46 is connected to the rear motor 30. Each of the first power control system 44, the second power control system 45, and the third power control system 46 individually includes an inverter and a converter. The first power control system 44, the second power control system 45, and the third power control system 46 are connected to one another, and also connected individually to a battery 47 including a lithium ion battery and a capacitor. For example, when the first motor 6 is operated as a generator while establishing a reaction torque, an electric power generated by the first motor 6 may be supplied directly to the second motor 7 and the rear motor 30 without passing through the battery 47. In order to prevent a restriction of an electrical input to the battery 47 and to reduce a thermal damage on the battery 47, the battery 47 is cooled by a cooling fan F as a cooling device. In the hybrid vehicle according to the embodiment, the second motor 7 and the rear motor 30 serve as a second rotary machine.

Figure 3:
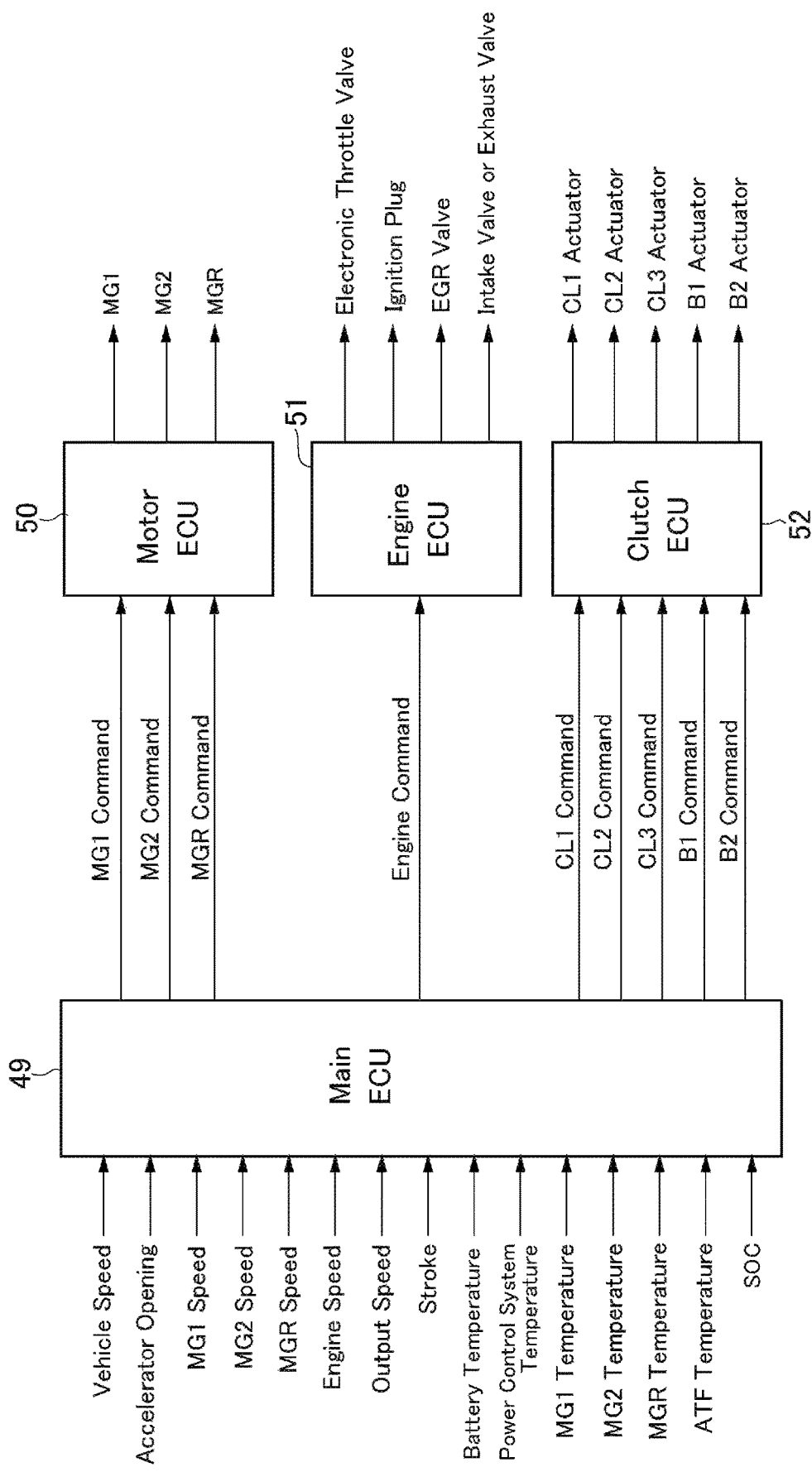
FIG. 3 is a block diagram showing a structure of an electronic control unit.

In order to control the first power control system 44, the second power control system 45, the third power control system 46, the engine 5, the clutches CL1, CL2, CL3, and the brakes B1,B2, the hybrid vehicle is provided with an electronic control unit (to be abbreviated as the "ECU" hereinafter) 48 as a controller. The ECU 48 is composed mainly of a microcomputer, and as shown in FIG. 3, the ECU 48 comprises a main ECU 49, a motor ECU 50, an engine ECU 51, and a clutch ECU 52.

The main ECU 49 is configured to execute a calculation based on incident data from sensors as well as maps and formulas installed in advance, and transmits a calculation result to the motor ECU 50, the engine ECU 51, and the clutch ECU 52 in the form of command signal. For example, the main ECU 49 receives data about; a vehicle speed; an accelerator position; a speed of the first motor 6; a speed of the second motor 7; a speed of the rear motor 30; a speed of the output shaft 15 of the engine 5; an output speed such as a speed of the ring gear 18 of the transmission section 10 or the counter shaft 22; strokes of pistons of the clutches CL1, CL2, CL3, the brakes B1, and B2; a temperature of the battery 47; temperatures of the ECUs 44, 45, and 46; a temperature of the first motor 6; a temperature of the second motor 7; a temperature of the rear motor 30; a temperature of oil (i.e., ATF) lubricating the power split mechanism 8 and the transmission 31; and a state of charge (to be abbreviated as the "SOC" hereinafter) level of the battery 47.

Specifically, command signals of output torques and speeds of the first motor 6, the second motor 7 and the rear motor 30 are transmitted from the main ECU 49 to the motor ECU 50. Likewise, command signals of an output torque and a speed of the engine 5 are transmitted from the main ECU 49 to the engine ECU 51. Further, command signals of torque transmitting capacities (including "0") of the clutches CL1, CL2, CL3, and the brakes B1, B2 are transmitted from the main ECU 49 to the clutch ECU 52.

The motor ECU 50 calculates current values applied to the first motor 6, the second motor 7, and the rear motor 30 based on the data transmitted from the main ECU 49, and transmits calculation results to the motors 6, 7, and 30 in the form of command signals. In the hybrid vehicle according to the embodiment, an AC motor is used individually as the first motor 6, the second motor 7, and the rear motor 30. In order to control the AC motor, the command signal transmitted from the motor ECU 50 includes command signals for controlling a frequency of a current generated by the inverter and a voltage value boosted by the converter.

The engine ECU 51 calculates current values to control opening degrees of an electronic throttle valve, an EGR (Exhaust Gas Restriction) valve, an intake valve, and an exhaust valve, and to activate an ignition plug, based on the data transmitted from the main ECU 49, and transmits calculation results to the valves and the plug in the form of command signals. Thus, the engine ECU 51 transmits command signals for controlling a power, an output torque and a speed of the engine 5.

The clutch ECU 52 calculates current values supplied to actuators controlling engagement pressures of the clutches CL1, CL2, CL3, and the brakes B1, B2, based on the data transmitted from the main ECU 49, and transmits calculation results to the actuators in the form of command signals.

In addition, the main ECU 49 also calculates a current value applied to the cooling fan F taking account of a temperature of the battery 47, and transmits calculation results to an actuator for activating the cooling fan in the form of command signal.

In the hybrid vehicle according to the embodiment, an operating mode may be selected from a hybrid mode (to be abbreviated as the "HV mode" hereinafter) in which the hybrid vehicle is propelled by a drive torque generated by the engine 5, and an electric vehicle mode (to be abbreviated as the "EV mode" hereinafter) in which the hybrid vehicle is propelled by drive torques generated by the first motor 6 and the second motor 7 without using the engine 5. The HV mode may be selected from a hybrid-low mode (to be abbreviated as the "HV-Lo mode" hereinafter) as a first mode of the embodiment, a hybrid-high mode (to be abbreviated as the "HV-Hi mode" hereinafter) as a second mode of the embodiment, and a fixed mode. Specifically, in the HV-Lo mode, a rotational speed of the engine 5 (i.e., a rotational speed of the input shaft 16) is increased higher than a rotational speed of the ring gear 18 of the transmission section 10 when a rotational speed of the first motor 6 is reduced substantially to zero. In turn, in the HV-Hi mode, a rotational speed of the engine 5 is reduced lower than a rotational speed of the ring gear 18 of the transmission section 10 when a rotational speed of the first motor 6 is reduced substantially to zero. Further, in the fixed mode, the engine 5 and the ring gear 18 of the transmission section 10 are always rotated at substantially same speeds.

The EV mode may be selected from a dual-motor mode in which both of the first motor 6 and the second motor 7 generate drive torques to propel the hybrid vehicle, and a single-motor mode in which only the second motor 7 generates a drive torque to propel the hybrid vehicle. Further, the dual-motor mode may be selected from an electric vehicle-low mode (to be abbreviated as the "EV-Lo mode" hereinafter) in which a torque of the first motor 6 is multiplied by a relatively larger factor, and an electric vehicle-high mode (to be abbreviated as the "EV-Hi mode" hereinafter) in which a torque of the first motor 6 is multiplied by a relatively smaller factor. In the single-motor mode, the hybrid vehicle is powered only by the second motor 7, while engaging the first clutch CL1, while engaging the second clutch CL2, or while disengaging both of the first clutch CL1 and the second clutch CL2.

FIG. 4 shows engagement states of the first clutch CL1, the second clutch CL2, and the first brake B1, and operating conditions of the first motor 6, the second motor 7, and the engine 5 in each operating mode. In FIG. 4, "•" represents that the engagement device is in engagement, "-" represents the engagement device is in disengagement, "G" represents that the motor serves mainly as a generator, "M" represents that the motor serves mainly as a motor, blank represents that the motor serves as neither a motor nor a generator or that the motor is not involved in propulsion of the hybrid vehicle, "ON" represents that the engine 5 generates a drive torque, and "OFF" represents that the engine 5 does not generate a drive torque.

Rotational speeds of the rotary elements of the power split mechanism 8, and directions of torques of the engine 5, the first motor 6, and the second motor 7 in each operating mode are indicated in FIGS. 5 to 10. In the nomographic diagrams shown in FIGS. 5 to 10, distances among the vertical lines represents a gear ratio of the power split mechanism 8, a vertical distance on the vertical line from the horizontal base line represents a rotational speed of the rotary member, an orientation of the arrow represents a direction of the torque, and a length of the arrow represents a magnitude of the torque.

Figure 5:
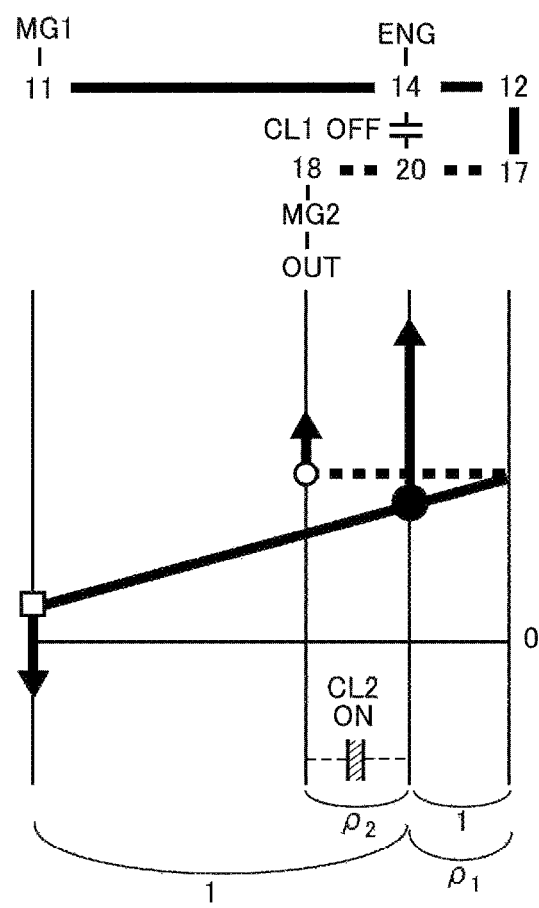
FIG. 5 is a nomographic diagram showing a situation in a HV-high mode.
Figure 6:
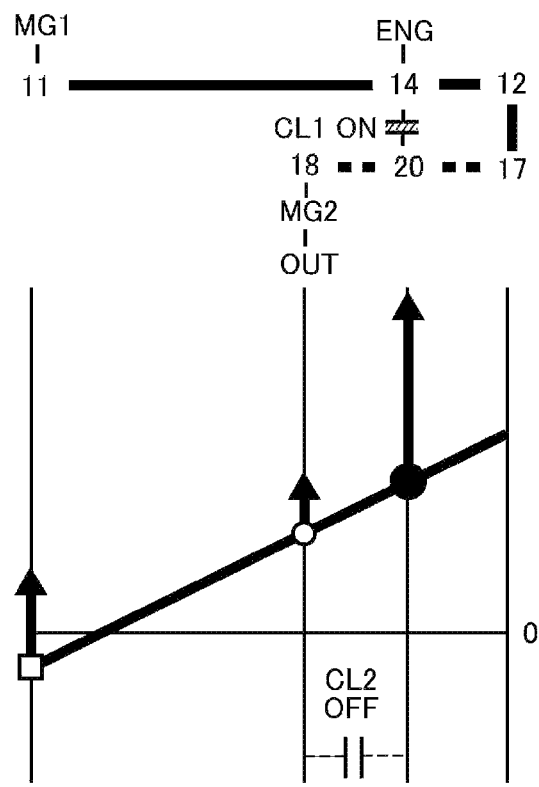
FIG. 6 is a nomographic diagram showing a situation in a HV-low mode.

As indicated in FIGS. 5 and 6, in the HV-Hi mode and the HV-Lo mode, any one of the first clutch CL1 and the second clutch CL2 is engaged, and the engine 5 generates a drive torque while establishing a reaction torque by the first motor 6. In this situation, a rotational speed of the first motor 6 is controlled in such a manner as to optimize a total energy efficiency in the first drive unit 2 including a fuel efficiency of the engine 5 and a driving efficiency of the first motor 6. Specifically, the total energy efficiency in the first drive unit 2 may be calculated by dividing a total energy consumption by a power to rotate the front wheels 1R and 1L. A rotational speed of the first motor 6 may be varied continuously, and the rotational speed of the engine 5 is governed by the rotational speed of the first motor 6 and a vehicle speed. That is, the power split mechanism 8 may serve as a continuously variable transmission.

As a result of establishing a reaction torque by the first motor 6, the first motor 6 may serve as a generator. In this situation, therefore, a power of the engine 5 is partially translated into an electric energy, and the remaining power of the engine 5 is delivered to the ring gear 18 of the transmission section 10. Specifically, the reaction torque established by the first motor 6 is governed by a split ratio of the torque delivered from the engine 5 to the first motor 6 side through the power split mechanism 8. Such split ratio between the torque delivered from the engine 5 to the first motor 6 side through the power split mechanism 8 and the torque delivered from the engine 5 to the ring gear 18 differs between the HV-Lo mode and the HV-Hi mode.

Given that the torque delivered to the first motor 6 side is "1", a ratio of the torque applied to the ring gear 18 in the HV-Lo mode may be expressed as "$1/(\rho1 \cdot \rho2)$", and a ratio of the torque applied to the ring gear 18 in the HV-Hi mode may be expressed as "$1/\rho1$". In other words, given that the torque of the engine 5 is "1", a ratio of the torque of the engine 5 delivered to the ring gear 18 in the HV-Lo mode may be expressed as "$1/(1-(\rho1 \cdot \rho2))$", and a ratio of the torque of the engine 5 delivered to the ring gear 18 in the HV-Hi mode may be expressed as "$1/(\rho1+1)$". In the above-expressed expressions, "$\rho1$" is a gear ratio of the power split section 9 (i.e., a ratio between teeth number of the ring gear 12 and teeth number of the sun gear 11), and "$\rho2$" is a gear ratio of the transmission section 10 (i.e., a ratio between teeth number of the ring gear 18 and teeth number of the sun gear 17). Specifically, "$\rho1$" and "$\rho2$" are individually smaller than "1". That is, in the HV-Lo mode, a ratio of the torque delivered to the ring gear 18 is increased in comparison with that in the HV-Hi mode. Accordingly, "$1/(1-(\rho1 \cdot \rho2))$" corresponds to a first predetermined ratio of the embodiment, and "$1/(\rho1+1)$" corresponds to a second predetermined ratio of the embodiment. Further, the ring gear 18 and the driven gear 23 serve as an output member in the embodiment. Here, when the speed of the engine 5 is increased by the torque generated by the engine 5, the output torque of the engine 5 is calculated by subtracting a torque required to increase the speed of the engine 5 from a torque generated by the engine 5.

In the HV mode, the electric power generated by the first motor 6 is supplied to the second motor 7, and in addition, the electric power accumulated in the battery 47 is also supplied to the second motor 7 as necessary. In the hybrid vehicle, the second motor 7 and the rear motor 30 are used to assist the drive torque generated by the engine 5. That is, the rear motor 30 may also be controlled in a similar manner as the second motor 7. In the following explanation, however, an example to assist the drive torque only by the second motor 7 will be explained.

Figure 7:
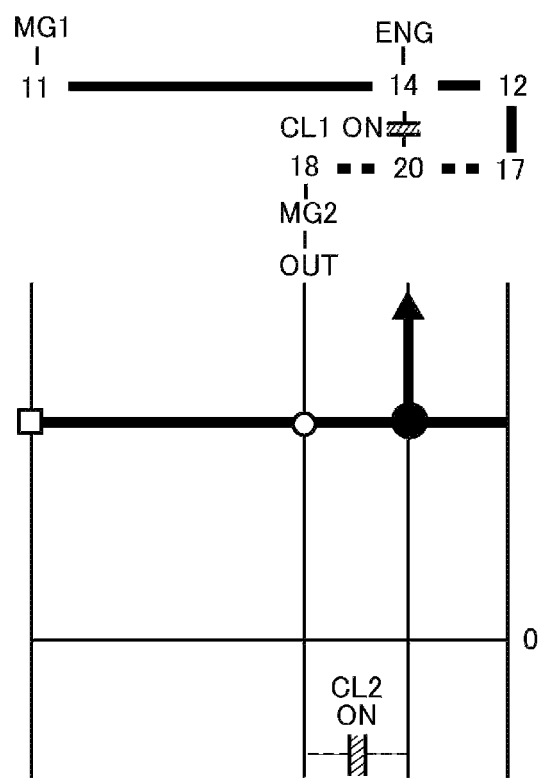
FIG. 7 is a nomographic diagram showing a situation in a fixed mode.

In the fixed mode, as indicated in FIG. 7, both of the first clutch CL1 and the second clutch CL2 are engaged so that all of the rotary elements in the power split mechanism 8 are rotated at a same speed. In other words, the output power of the engine 5 will not be translated into an electric energy by the first motor 6 and the second motor 7. For this reason, a power loss associated with such energy conversion will not be caused in the fixed mode and hence power transmission efficiency can be improved.

Figure 8:
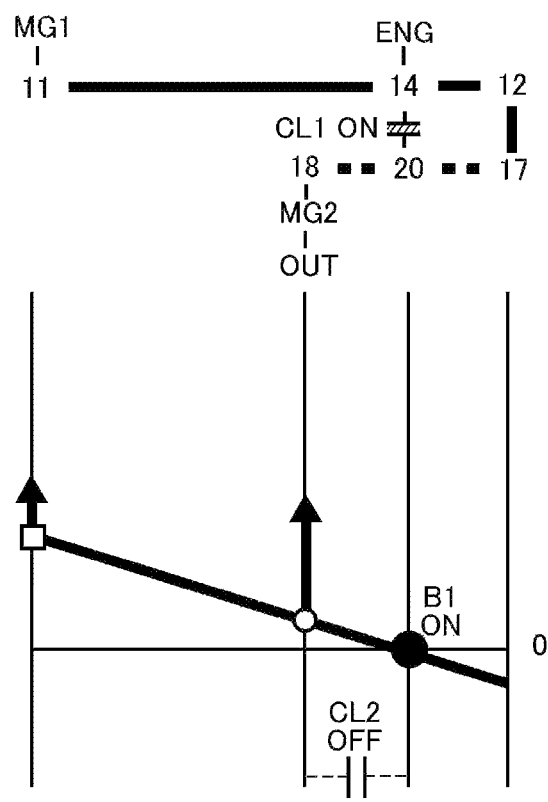
FIG. 8 is a nomographic diagram showing a situation in an EV-Lo mode.
Figure 9:
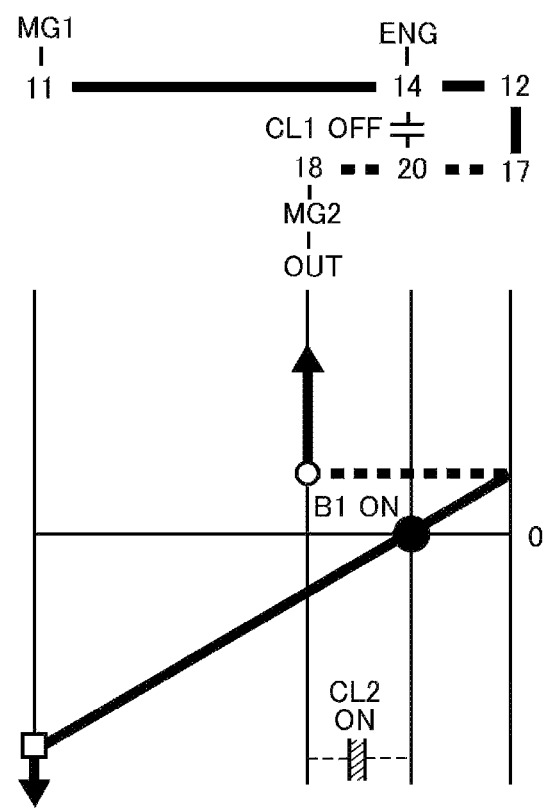
FIG. 9 is a nomographic diagram showing a situation in the EV-Hi mode.
Figure 10:
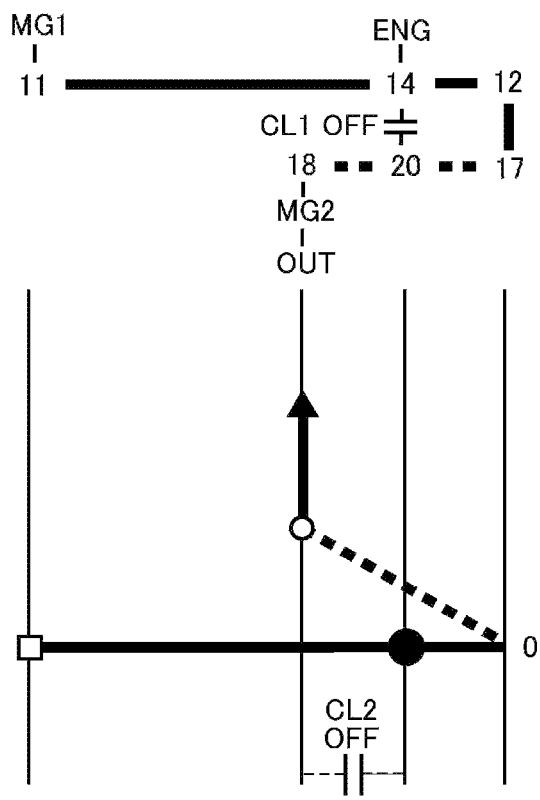
FIG. 10 is a nomographic diagram showing a situation in a single-motor mode.

As indicated in FIGS. 8 and 9, in the EV-Lo mode and the EV-Hi mode, the first brake B1 is engaged, and the first motor 6 and the second motor 7 generates the drive torques to propel the hybrid vehicle. In the EV-Lo mode, a ratio of a rotational speed of the ring gear 18 of the transmission section 10 to a rotational speed of the first motor 6 is reduced smaller than that in the EV-Hi mode. In other words, a speed reducing ratio in the EV-Lo mode is greater than that in the EV-Hi mode so that a greater drive force is established in the EV-Lo mode. As indicated in FIG. 10, in the single-motor mode, only the second motor 7 generates a drive torque, and both of the clutch CL1 and the second clutch CL2 are disengaged. In the single-motor mode, therefore, all of the rotary elements of the power split mechanism 8 are stopped. For this reason, the engine 5 and the first motor 6 will not be rotated passively, and hence the power loss can be reduced.

In the hybrid vehicle, the operating mode is selected on the basis of an SOC level of the battery 47, a vehicle speed, a required drive force and so on. According to the embodiment, a selection pattern of the operating mode may be selected from a CS (i.e., Charge Sustaining) mode in which the operating mode is selected in such a manner as to maintain the SOC level of the battery 47 as far as possible, and a CD (i.e., Charge Depleting) mode in which the operating mode is selected in such a manner as to propel the hybrid vehicle while consuming the electric power accumulated in the battery 47. Specifically, the CS mode is selected when the SOC level of the battery 47 is relatively low, and the CD mode is selected when the SOC level of the battery 47 is relatively high.

Figure 11:
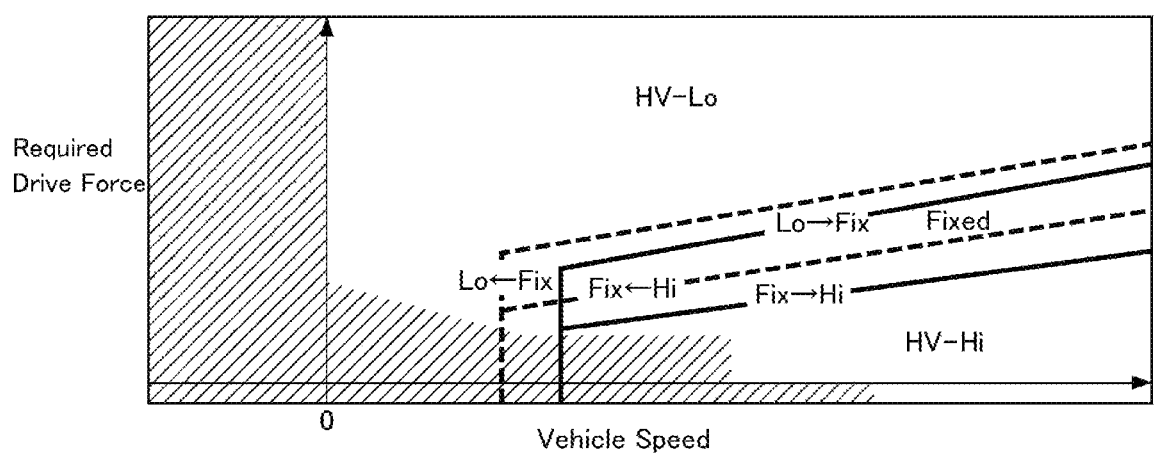
FIG. 11 shows a map for determining an operating mode during propulsion in a CS mode.

FIG. 11 shows an example of a map used to select the operating mode during propulsion in the CS mode. In FIG. 11, the vertical axis represents a required drive force, and the horizontal axis represents a vehicle speed. In order to select the operating mode of the hybrid vehicle, the vehicle speed may be detected by a vehicle speed sensor, and the required drive force may be estimated based on an accelerator position detected by an accelerator sensor.

In FIG. 11, the hatched area is an area where the single-motor mode is selected. In the CS mode, the single-motor mode is selected when the hybrid vehicle is propelled in a reverse direction irrespective of the required drive force, and when the hybrid vehicle is propelled in a forward direction and the required drive force is small (or when decelerating). Such area where the single-motor mode is selected is determined based on specifications of the second motor 7 and the rear motor 30.

During forward propulsion in the CS mode, the HV mode is selected when the large drive force is required. In the HV mode, the drive force may be generated from a low speed range to a high speed range. When the SOC level falls close to a lower limit level, therefore, the HV mode may be selected even if an operating point governed by the required drive force and the vehicle speed falls within the hatched area.

As described, the HV mode may be selected from the HV-Lo mode, the HV-Hi mode, and the fixed mode. In the CS mode, specifically, the HV-Lo mode is selected when the vehicle speed is relatively low and the required drive force is relatively large, the HV-Hi mode is selected when the vehicle speed is relatively high and the required drive force is relatively small, and the fixed mode is selected when the operating point falls between an area where the HV-Lo mode is selected and an area where the HV-Hi mode is selected.

In the CS mode, the operating mode is shifted from the fixed mode to the HV-Lo mode when the operating point is shifted across the "Lw←Fix" line from right to left, or when the operating point is shifted across the "Lw←Fix" line upwardly from the bottom. By contrast, the operating mode is shifted from the HV-Lo mode to the fixed mode when the operating point is shifted across the "Lo→Fix" line from left to right, or when the operating point is shifted across the "Lo→Fix" line downwardly from the top. Likewise, the operating mode is shifted from the HV-Hi mode to the fixed mode when the operating point is shifted across the "Fix←Hi" line from right to left, or when the operating point is shifted across the "Fix←Hi" line upwardly from the bottom. By contrast, the operating mode is shifted from the fixed mode to the HV-Hi mode when the operating point is shifted across the "Fix→Hi" line from left to right, or when the operating point is shifted across the "Fix→Hi" line downwardly from the top.

Figure 12:
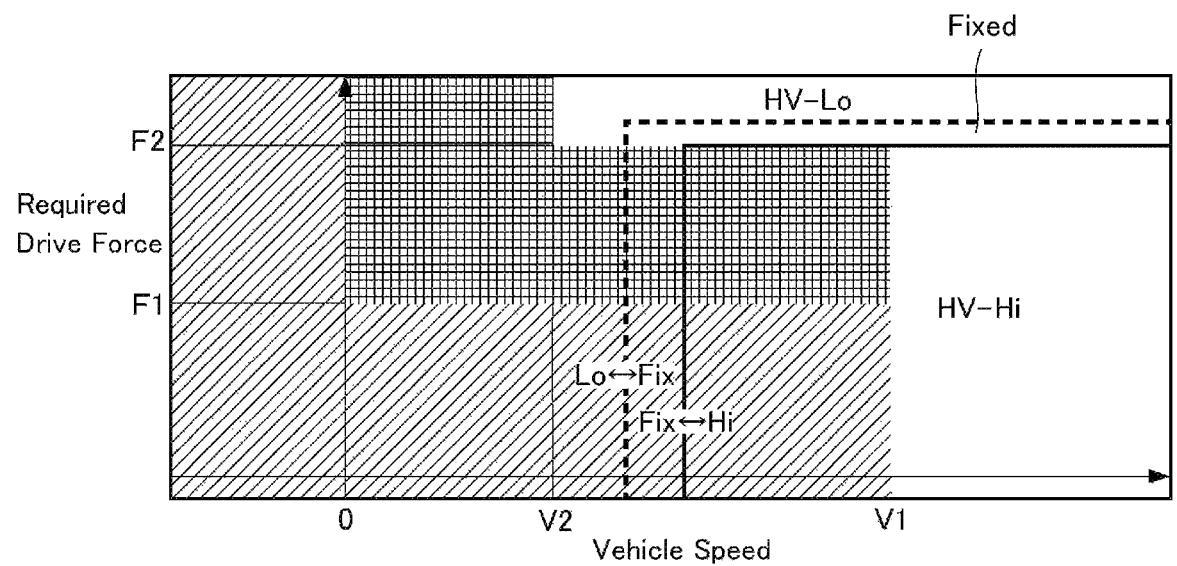
FIG. 12 shows a map for determining an operating mode during propulsion in a CD mode.

FIG. 12 shows an example of a map used to select the operating mode during propulsion in the CD mode. In FIG. 12, the vertical axis also represents the required drive force, and the horizontal axis also represents the vehicle speed.

In FIG. 12, the hatched area is also an area where the single-motor mode is selected. In the CD mode, the single-motor mode is selected when the hybrid vehicle is propelled in a reverse direction irrespective of the required drive force, and when the hybrid vehicle is propelled in a forward direction and the required drive force is smaller than a first threshold force value F1 (or when decelerating). Such area where the single-motor mode is selected is also determined based on specifications of the second motor 7 and the rear motor 30.

During forward propulsion in the CD mode, the dual-motor mode is selected when the drive force larger than the first threshold force value F1 is required. In this case, the HV mode is selected when the vehicle speed is higher than a first threshold speed V1, or when the vehicle speed is higher than a second threshold speed V2 and the required drive force is greater than a second threshold force value F2. As described, the drive force may be generated from the low speed range to the high speed range in the HV mode. When the SOC level of the battery 47 falls close to the lower limit level, therefore, the HV mode may be selected even if the operating point falls within the areas where the single-motor mode and the dual-motor mode are selected.

In the CD mode, the HV-Lo mode is also selected when the vehicle speed is relatively low and the required drive force is relatively large, the HV-Hi mode is also selected when the vehicle speed is relatively high and the required drive force is relatively small, and the fixed mode is also selected when the operating point falls between the area where the HV-Lo mode is selected and the area where the HV-Hi mode is selected.

In the CD mode, the operating mode is shifted between the fixed mode and the HV-Lo mode when the operating point is shifted across the "Lo↔Fix" line. Likewise, the operating mode is shifted between the HV-Hi mode and the fixed mode when the operating point is shifted across the "Fix↔Hi".

In the maps shown in FIGS. 11 and 12, the areas of each of the operating mode and the lines defining the areas may be altered depending on temperatures of the members of the first drive unit 2, the battery 47, the power control systems 44, 45, and 46, and the SOC level of the battery 47.

During propulsion in the HV-Hi mode or the HV-Lo mode, a brake force may be applied to the front wheels 1R and 1L by applying a brake torque (i.e., an engine braking torque) resulting from a power loss of the engine 5 to the output shaft 15 while controlling a torque of the first motor 6. To this end, a speed of the first motor 6 is controlled in such a manner as to maintain a speed of the engine 5 to a predetermined level in accordance with a required brake force. Such control to apply the engine braking force of the engine 5 to the drive wheels will be called as the "engine brake control" of the embodiment. In addition, a regenerative torque resulting from generating electricity by the second motor 7 may also be applied to the front wheels 1R and 1L. Such control to apply the regenerative torque established by the second motor 7 to the drive wheels will be called as the "regeneration control" of the embodiment.

Specifically, the brake torque of the engine applied to the output shaft 15 is established in accordance with a friction torque and a pumping loss in the engine 5. That is, the brake torque of the engine 5 is increased with an increase in a speed of the engine 5. When establishing the brake torque of the engine 5, a fuel supply to the engine 5 is stopped, and it is preferable to close a throttle valve to increase the brake torque.

Figure 13:
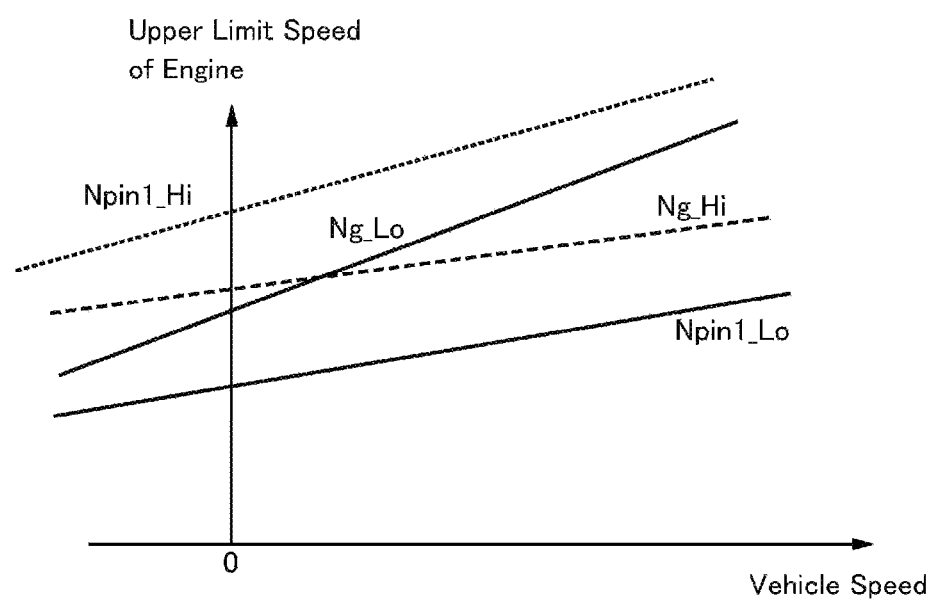
FIG. 13 is a graph showing an upper limit speed of the engine.

As indicated in FIG. 13, an upper limit speed of the engine 5 is determined based on upper limit speeds of the pinion gears 13 of the power split section 9, the first motor 6 and so on. In FIG. 13, the horizontal axis represents a vehicle speed, and a vertical axis represents an upper limit speed of the engine 5. In FIG. 13, the line Npin1_Lo indicates a change in the upper limit speed of the engine 5 set on the basis of the upper limit speed of the pinion gear 13 during propulsion in the HV-Lo mode. In this case, as indicated by the line Npin1_Lo, the upper limit speed of the engine 5 is increased mildly with an increase in the vehicle speed. In turn, the line Ng_Lo indicates a change in the upper limit speed of the engine 5 set on the basis of the upper limit speed of the first motor 6 during propulsion in the HV-Lo mode. In this case, as indicated by the line Ng_Lo, the upper limit speed of the engine 5 is increased at a relatively larger rate with an increase in the vehicle speed. As can be seen from FIG. 13, in the HV-Lo mode, the upper limit speed of the engine 5 set on the basis of the upper limit speed of the pinion gear 13 is lower than the upper limit speed of the engine 5 set on the basis of the upper limit speed of the first motor 6 over the entire speed range. In the HV-Lo mode, accordingly, the rotational speed of the engine 5 is limited based on the upper limit speed of the pinion gear 13. Accordingly, the pinion gears 13 and the sun gear 11 connected to the first motor 6 serve as the "predetermined rotary member" of the embodiment.

In FIG. 13, the dashed line Npin1_Hi indicates a change in the upper limit speed of the engine 5 set on the basis of the upper limit speed of the pinion gear 13 during propulsion in the HV-Hi mode. As can be seen from FIG. 13, the upper limit speed of the engine 5 set on the basis of upper limit speed of the pinion gear 13 is higher in the HV-Hi mode over the entire speed range in comparison with that in the HV-Lo mode. Here, an increasing rate of the upper limit speed of the engine 5 set on the basis of upper limit speed of the pinion gear 13 in the HV-Hi mode is substantially identical to that in the HV-Lo mode. In turn, the dashed line Ng_Hi indicates a change in the upper limit speed of the engine 5 set on the basis of the upper limit speed of the first motor 6 during propulsion in the HV-Hi mode. In this case, as indicated by the dashed line Ng_Hi, the upper limit speed of the engine 5 is increased mildly with an increase in the vehicle speed. As can be seen from FIG. 13, in the HV-Hi mode, the upper limit speed of the engine 5 set on the basis of the upper limit speed of the first motor 6 is lower than the upper limit speed of the engine 5 set on the basis of the upper limit speed of the pinion gear 13 over the entire speed range. In the HV-Hi mode, accordingly, the rotational speed of the engine 5 is limited based on the upper limit speed of the first motor 6. Further, the upper limit speed of the engine 5 in the HV-Hi mode is higher than that in the HV-Lo mode.

Figure 14:
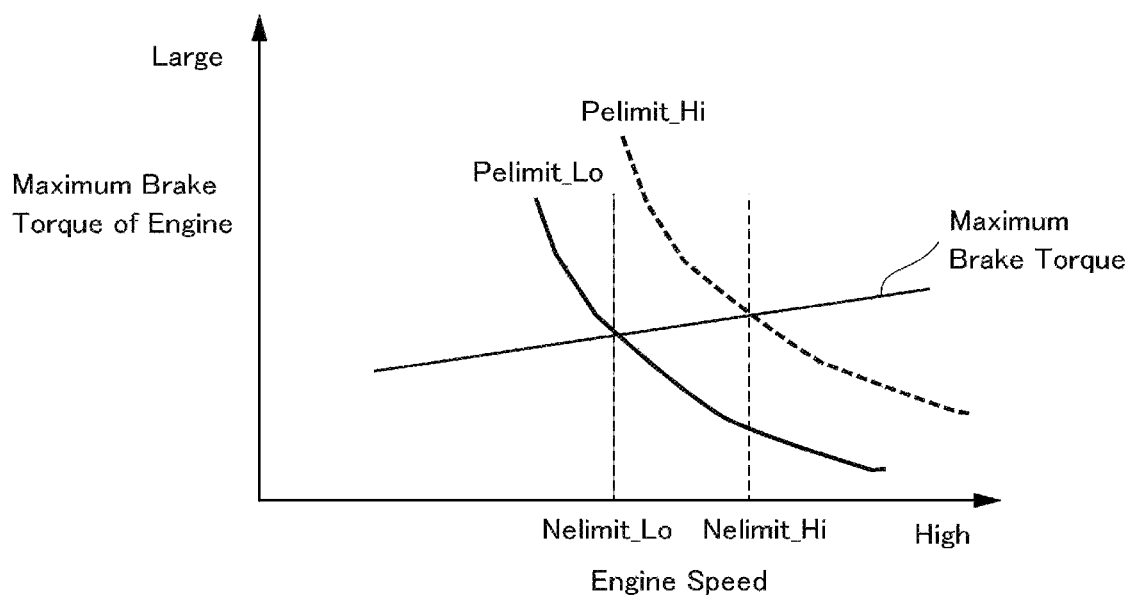
FIG. 14 is a graph showing upper limit powers of the engine in the HV-Lo mode and the HV-Hi mode.

Upper limit powers of the engine 5 (i.e., braking powers) in the HV-Lo mode and the HV-Hi mode are indicated in FIG. 14. In FIG. 14, the horizontal axis represents an engine speed, and the vertical axis represents a maximum brake torque of the engine 5. As indicated in FIG. 14, the maximum brake torque of the engine 5 is increased with an increase in the engine speed. Specifically, the upper limit braking power of the engine 5 may be obtained by multiplying a maximum brake torque of the engine 5 by an upper limit speed of the engine 5. In FIG. 14, the upper limit braking power of the engine 5 in the HV-Lo mode is indicated by a solid curve Pelimit_Lo, and the upper limit braking power of the engine 5 in the HV-Hi mode is indicated by a dashed curve Pelimit_Hi. As can be seen from FIG. 14, the upper limit braking power of the engine 5 is greater in the HV-Hi mode than that in the HV-Lo mode. In FIG. 14, an upper limit speed of the engine 5 in the HV-Lo mode is indicated by the vertical dashed line Nelimit_Lo, and an upper limit speed of the engine 5 in the HV-Hi mode is indicated by the vertical dashed line Nelimit_Hi.

As described, in the HV-Lo mode, the ratio of the torque delivered to the output side is greater than that in the HV-Hi mode. Accordingly, even if the upper limit braking power of the engine 5 in the HV-Lo mode is smaller than that in the HV-Hi mode, the power (or the brake torque) delivered to the ring gear 18 is increased.

Given that a gear ratio between the output gear 21 and the driven gear 23, and a gear ratio between the drive gear 28 and the driven gear 23 are "1", the brake force in the HV-Lo mode and the brake force in the HV-Hi mode may be calculated by adding a torque delivered from the ring gear 18 to an output torque of the second motor 7. That is, if the brake torque can be established sufficiently by the second motor 7, a larger brake torque can be established in the HV-Lo mode than that established in the HV-Hi mode.

However, an electrical input to the battery 47 may be restricted depending on temperatures of the battery 47, the first power control system 44, the second power control system 45, and an SOC level of the battery 47. If the electrical input to the battery 47 is restricted, the second motor 7 may not establish the brake torque sufficiently.

Specifically, when establishing the brake torque by rotating the engine 5 at the upper limit speed, the first motor 6 is controlled in such a manner as to generate a torque to maintain the rotational speed of the engine 5 at the upper limit speed. In this situation, the first motor 6 may be operated as a motor while consuming electric power, and the electric consumption of the first motor 6 thus operated as a motor may be calculated by multiplying an output torque of the first motor 6 by a rotational speed of the first motor 6. As described, the upper limit speed of the engine 5 is lower in the HV-Lo mode than that in the HV-Hi mode, and a rotational speed of the first motor 6 is governed by the upper limit speed of the engine 5, the vehicle speed, and the gear ratio in each mode. Accordingly, a rotational speed of the first motor 6 in the HV-Lo mode may be reduced lower than that in the HV-Hi mode. In addition, in the HV-Lo mode, the first motor 6 may also be operated as a generator depending on the vehicle speed.

Figure 15:
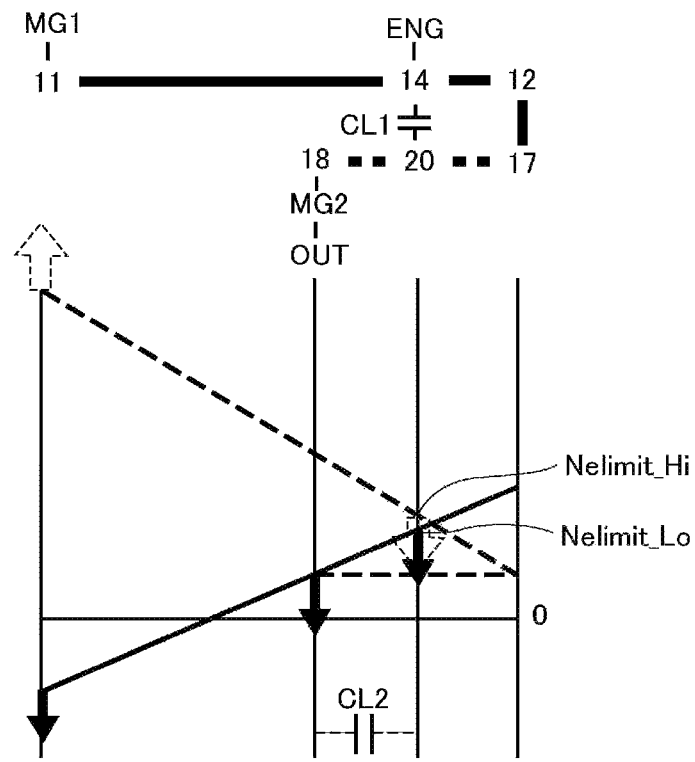
FIG. 15 is a nomographic diagram showing a situation when propelling the vehicle by rotating the engine at the upper limit speed.

FIG. 15 shows rotational speeds of the rotary element of the power split mechanism 8 during propulsion while establishing a brake torque by rotating the engine 5 at the upper limit speed. In FIG. 15, the solid line represents rotational speeds of the rotary element in the HV-Lo mode, and the dashed line represents rotational speeds of the rotary element in the HV-Hi mode. As can be seen from FIG. 15, the rotational speed of the first motor 6 is lower in the HV-Lo mode than that in the HV-Hi mode.

As described, the first motor 6 and the second motor 7 are electrically connected to each other, and hence an electric power generated by the second motor 7 may be increased by consuming a larger amount of electric power by the first motor 6. In other words, an electric power generated by the second motor 7 may be increased by reducing an electric power generated by the first motor 6. Consequently, the brake torque of the second motor 7 may be increased. In addition, in the HV-Lo mode, a rotational speed of the first motor 6 may be lower than that in the HV-Hi mode. In this case, an electrical consumption of the first motor 6 in the HV-Lo mode may be reduced in comparison with that in the HV-Hi mode. In this situation, if the electrical input to the battery 47 is restricted for some reason, and if the rotational speed of the first motor 6 in the HV-Lo mode is lower than that in the HV-Hi mode, an available brake torque established by the second motor 7 in the HV-Lo mode may be reduced smaller than that established in the HV-Hi mode. In the case that the brake torque of the second motor 7 is thus restricted, a maximum brake force available in the HV-Lo mode may be reduced smaller than a maximum brake force in the HV-Hi mode, even if the torque of the engine 5 delivered to the driven gear 23 in the HV-Lo mode is larger than that in the HV-Hi mode.

Figure 16:
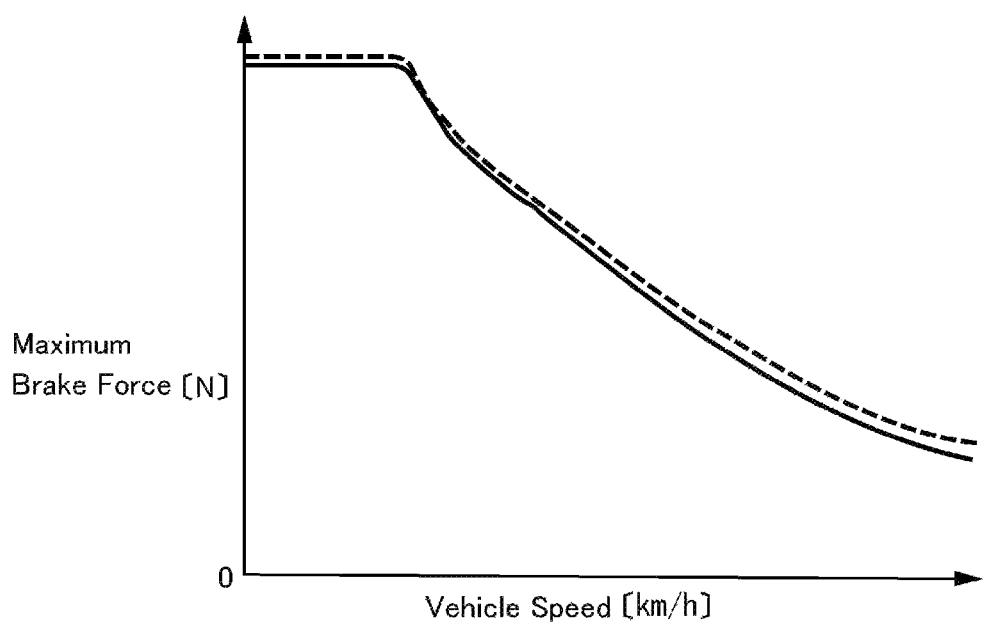
FIG. 16 is a graph showing a maximum brake force of a case in which an electrical input to the battery is not restricted.
Figure 17:
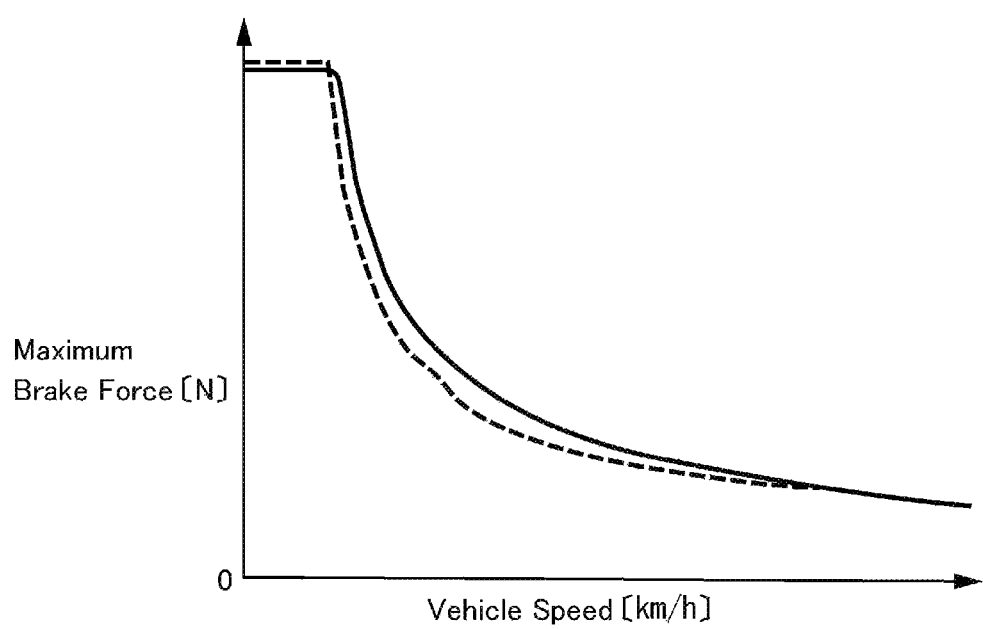
FIG. 17 is a graph showing a maximum brake force of a case in which a restricted amount of the electrical input to a battery is large.

FIG. 16 shows the maximum brake force of the case in which the electrical input to the battery 47 is not restricted, and FIG. 17 shows the maximum brake force of the case in which the electrical input to the battery 47 is restricted significantly. In FIGS. 16 and 17, the horizontal axis individually represents the vehicle speed, the vertical axis individually represents the maximum brake force, the solid curve individually represents the maximum brake force in the HV-Hi mode, and the dashed curve individually represents the maximum brake force in the HV-Lo mode.

As indicated in FIG. 16, in the condition where the electricity may be accumulated in the battery 47 sufficiently, the maximum brake force is larger in the HV-Lo mode than the HV-Hi mode. By contrast, as indicated in FIG. 17, the maximum brake force is generally larger in the HV-Hi mode than the HV-Lo mode.

The control system according to the embodiment is configured to prevent a reduction in the maximum brake force in the hybrid vehicle resulting from restriction of the electrical input to the battery 47. For this purpose, the control system executes a routine shown in FIG. 18. At step S1, it is determined whether or not a vehicle speed V is higher than a first predetermined speed Vs1. Specifically, the first predetermined speed Vs1 is set to a level at which the brake force comparable to that of the case in which the electrical input to the battery 47 is not restricted can be established, even if the input power allowed to accumulate in the battery 47 is small. More specifically, the first predetermined speed Vs1 is set on the basis of a base speed of the second motor 7 in such a manner that the brake torque of the second motor 7 is kept constant irrespective of the rotational speed of the second motor 7. Here, the first predetermined speed Vs1 may be not only a variable that is varied depending on temperature conditions but also a fixed value.

If the vehicle speed V is higher than the first predetermined speed Vs1 so that the answer of step S1 is YES, it is determined whether or not the input power allowed to accumulate in the battery 47 decreases to the extent that the maximum brake force expected to be established in the HV-Lo mode based on the current condition is reduced smaller than the maximum brake force expected to be established in the HV-Hi mode based on the current condition. To this end, for example, the input power allowed to accumulate in the battery 47 may be determined based on a thermal limitation or an SOC level of the battery 47. At step S2, specifically, it is determined whether or not the input power allowed to accumulate in the battery 47 is smaller than a first threshold power W1. For example, the first threshold power W1 may be set based on a result of an experimentation or simulation.

Specifically, the first threshold power W1 is set to a value possible to fulfill the following relations (1) −Wg+Win>Wm, and (2) Tr_Lo−Tr_Hi<Ts−Tm_Lo. In the inequality (1), "Wg" is a power consumed to control the first motor 6 in such a manner as to increase the engine speed to the upper limit speed Nelimit_Hi in the HV-Hi mode, "Win" is a power corresponding to the first threshold power W1, and "Wm" is a power generated by the second motor 7 by generating a rated torque by the second motor 7 at a current vehicle speed. In the inequality (2): "Tr_Lo" is a torque expected to be delivered to the ring gear 18 by rotating the engine 5 at the upper limit speed Nelimit_Lo in the HV-Lo mode; "Tr_Hi" is a torque expected to be delivered to the ring gear 18 by rotating the engine 5 at the upper limit speed Nelimit_Hi in the HV-Hi mode; "Ts" is the rated torque of the second motor 7 at a current vehicle speed; and "Tm_Lo" is an output torque of the second motor 7 generated by controlling the second motor 7 in such a manner as to adjust the input power to the battery 47 within the first threshold power W1, while controlling the first motor 6 in such a manner as to increase the engine speed to the upper limit speed Nelimit_Lo in the HV-Lo mode.

Instead, the maximum brake forces in the HV-Hi mode and the HV-Lo mode in accordance with the input power to the battery 47 may also be determined in advance based on a result of experimentation or simulation. In this case, the input power to the battery 47 possible to reduce the maximum brake force in the HV-Lo mode smaller than the maximum brake force in the HV-Hi mode may be employed as the first threshold power W1. Optionally, the first threshold power W1 may be set larger than the value possible to reduce the maximum brake force in the HV-Lo mode smaller than the maximum brake force in the HV-Hi mode, taking account of deterioration of the thermal condition.

If the input power allowed to accumulate in the battery 47 is smaller than the first threshold power W1 so that the answer of step S2 is YES, the routine progresses to step S3 to restrict selection of the HV-Lo mode, and thereafter returns. In this case, however, the HV-Lo mode will not be inhibited completely. For example, the current operating mode (e.g., the HV-Hi mode or the fixed mode) may be maintained until a predetermined period of time has elapsed, or until the rotational speed of the second motor 7 is reduced lower than the base speed, even if the condition to shift the operating mode from the HV-Hi mode or the fixed mode to the HV-Lo mode is satisfied with reference to the maps shown in FIGS. 11 and 12. Instead, it is possible to allow selection of the HV-Lo mode when a required brake force can be achieved even if the operating mode is shifted from the HV-Hi mode or the fixed mode to the HV-Lo mode. Further, if the HV-Lo mode is currently selected but the required brake force can be achieved in the HV-Lo mode, it is not necessary to shift the operating mode from the HV-Lo mode to the HV-Hi mode or the fixed mode.

By contrast, if the vehicle speed V is lower than the first predetermined speed Vs1 so that the answer of step S1 is NO, or if the input power allowed to accumulate in the battery 47 is greater than the first threshold power W1 so that the answer of step S2 is NO, the routine progresses to step S4 to determine whether or not the selection of the HV-Lo mode is restricted. To this end, a flag representing a restriction of selection of the HV-Lo mode is turned on when the restriction at step S3 is executed, and the determination at step S4 is made based on the flag.

If the selection of the HV-Lo mode is restricted so that the answer of step S4 is YES, the routine progresses to step S5 to determine whether or not the vehicle speed V is lower than a second predetermined speed Vs2. That is, at step S5, it is determined whether or not the restriction of selection of the HV-Lo mode can be cancelled. To this end, specifically, it is determined whether or not the rotational speed of the second motor 7 is reduced lower than the base speed. Specifically, in order to reduce a frequency of the restriction of the HV-Lo mode, the second predetermined speed Vs2 is set to be lower than the first predetermined speed Vs1.

If the vehicle speed V is lower than the second predetermined speed Vs2 so that the answer of step S5 is YES, the routine progresses to step S6 to cancel the restriction of selection of the HV-Lo mode, and to turn off the flag representing the restriction of selection of the HV-Lo mode. Thereafter, the routine returns. By contrast, if the vehicle speed V is higher than the second predetermined speed Vs2 so that the answer of step S5 is NO, the routine progresses to step S7 to determine whether or not the input power allowed to accumulate in the battery 47 is smaller than a second threshold power W2. That is, at step S7, it is also determined whether or not the restriction of selection of the HV-Lo mode can be cancelled. To this end, specifically, it is determined whether or not the electric power possible to increase the maximum brake force in the HV-Lo mode greater than the maximum brake force in the HV-Hi mode can be accumulated in the battery 47. Specifically, in order to reduce the frequency of the restriction of the HV-Lo mode, the second threshold power W2 is set to be greater than the first threshold power W1.

If the input power allowed to accumulate in the battery 47 is greater than the second threshold power W2 so that the answer of step S7 is YES, the routine progresses to step S6 to cancel the restriction of selection of the HV-Lo mode, and to turn off the flag representing the restriction of selection of the HV-Lo mode. Thereafter, the routine returns. By contrast, if the selection of the HV-Lo mode is not restricted so that the answer of step S4 is NO, or if the input power allowed to accumulate in the battery 47 is smaller than the second threshold power W2 so that the answer of step S7 is NO, the routine returns. That is, the restriction of selection of the HV-Lo mode is continued.

Figure 19:
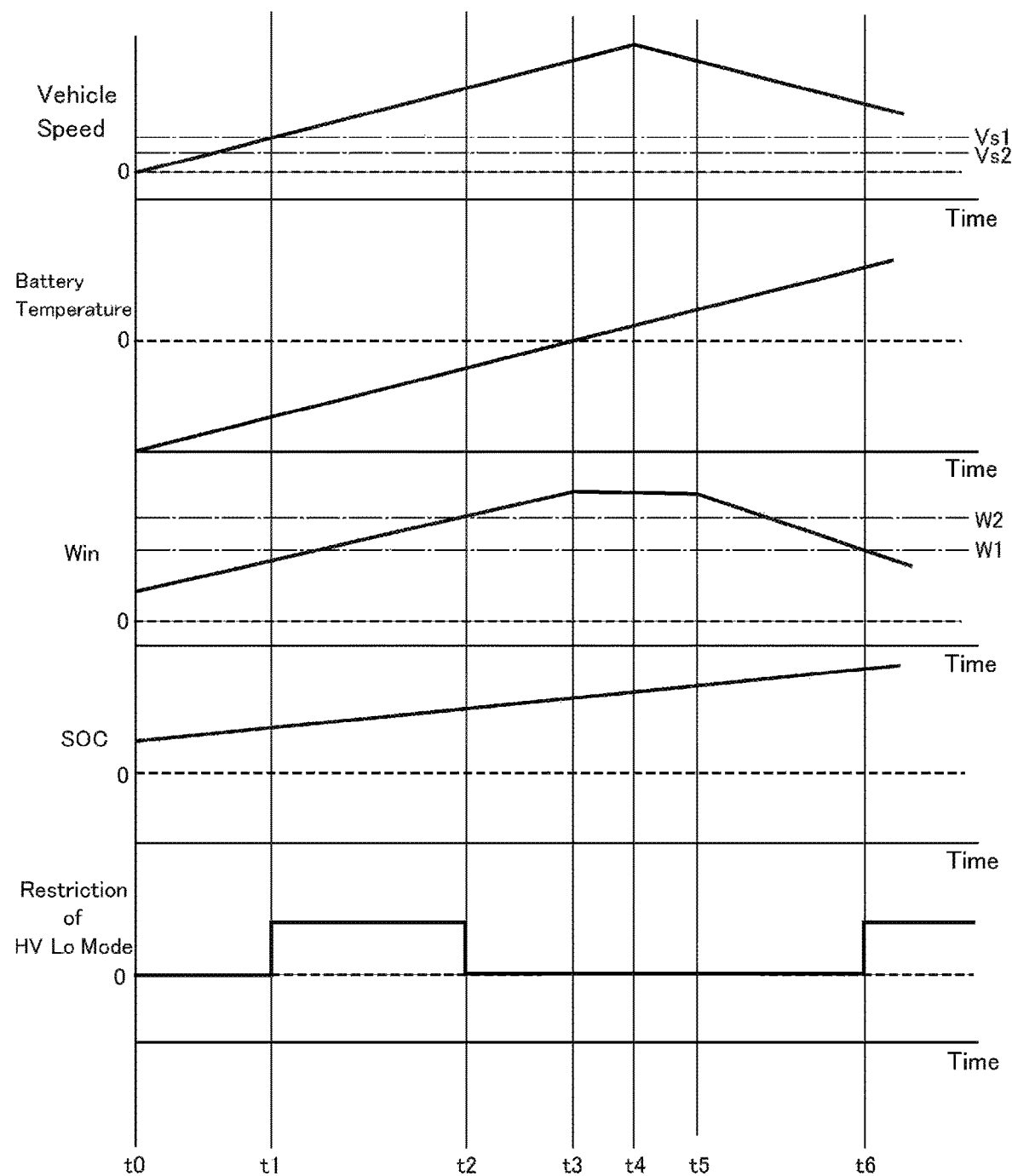
FIG. 19 is a time chart showing a temporal restriction of the HV-Lo mode in accordance with a temporal change in the input power allowed to accumulate in the battery.

FIG. 19 indicates temporal changes in the input power allowed to accumulate in the battery 47 and the restriction of selection of the HV-Lo mode, after accelerating the stopping hybrid vehicle to a predetermined speed and then decelerate the hybrid vehicle.

As shown in FIG. 19, the hybrid vehicle is launched at point t0. A speed of the hybrid vehicle reaches the predetermined speed at point t4, and gradually reduced after point t4. In the example shown in FIG. 19, the SOC level of the battery 47 is low at point t0, and hence the hybrid vehicle is propelled while supplying the electric power translated from a part of the engine power to the battery 47. For this reason, the SOC level of the battery 47 is gradually increased from point t0. In addition, a temperature of the battery 47 is low at point t0, the input power allowed to accumulate in the battery 47 is limited relatively significantly. That is, the input power allowed to accumulate in the battery 47 is small. The temperature of the battery 47 is raised from point to, and the input power allowed to accumulate in the battery 47 is increased from point t0 to point t3. In this situation, the SOC level of the battery 47 is increased gradually, and exceeds the predetermined level at point t5. Consequently, the input power allowed to accumulate in the battery 47 decreases from point t5.

From point t0 to point t1, the vehicle speed is lower than the first predetermined speed Vs1, and hence the selection of the HV-Lo mode has not yet been restricted. At point t1, the vehicle speed exceeds the first predetermined speed Vs1 but the input power allowed to accumulate in the battery 47 is still smaller than the first threshold power W1. In this situation, therefore, the selection of the HV-Lo mode is restricted. Then, at point t2, the input power allowed to accumulate in the battery 47 exceeds the second threshold power W2. Consequently, the restriction of selection of the HV-Lo mode is cancelled at point t2.

The input power allowed to accumulate in the battery 47 starts decreasing from point t5, and when the input power allowed to accumulate in the battery 47 falls below the first threshold power W1 at point t6, the selection of the HV-Lo mode is restricted again. At point t6, since the vehicle speed is higher than the first predetermined speed Vs1, the routine shown in FIG. 18 progresses from step S1 to step S2.

Thus, selection of the HV-Lo mode is restricted when the input power allowed to accumulate in the battery 47 decreases to the extent that the maximum brake force expected to be established in the HV-Lo mode based on the current condition is reduced smaller than the maximum brake force expected to be established in the HV-Hi mode based on the current condition. According to the embodiment, therefore, the maximum brake force will not be restricted by the limitation of the input power allowed to accumulate in the battery 47. In addition, in the low speed range lower than the first predetermined speed Vs1 and the second predetermined speed Vs2, selection of the HV-Lo mode will not be restricted. According to the embodiment, therefore, the maximum brake force will not be restricted in the low speed range. Specifically, in the low speed range, the brake force indicated by the dashed lime shown in FIG. 16 can be established, and in the remaining speed range, the brake force indicated by the solid lime shown in FIG. 17 can be established.

Figure 18:
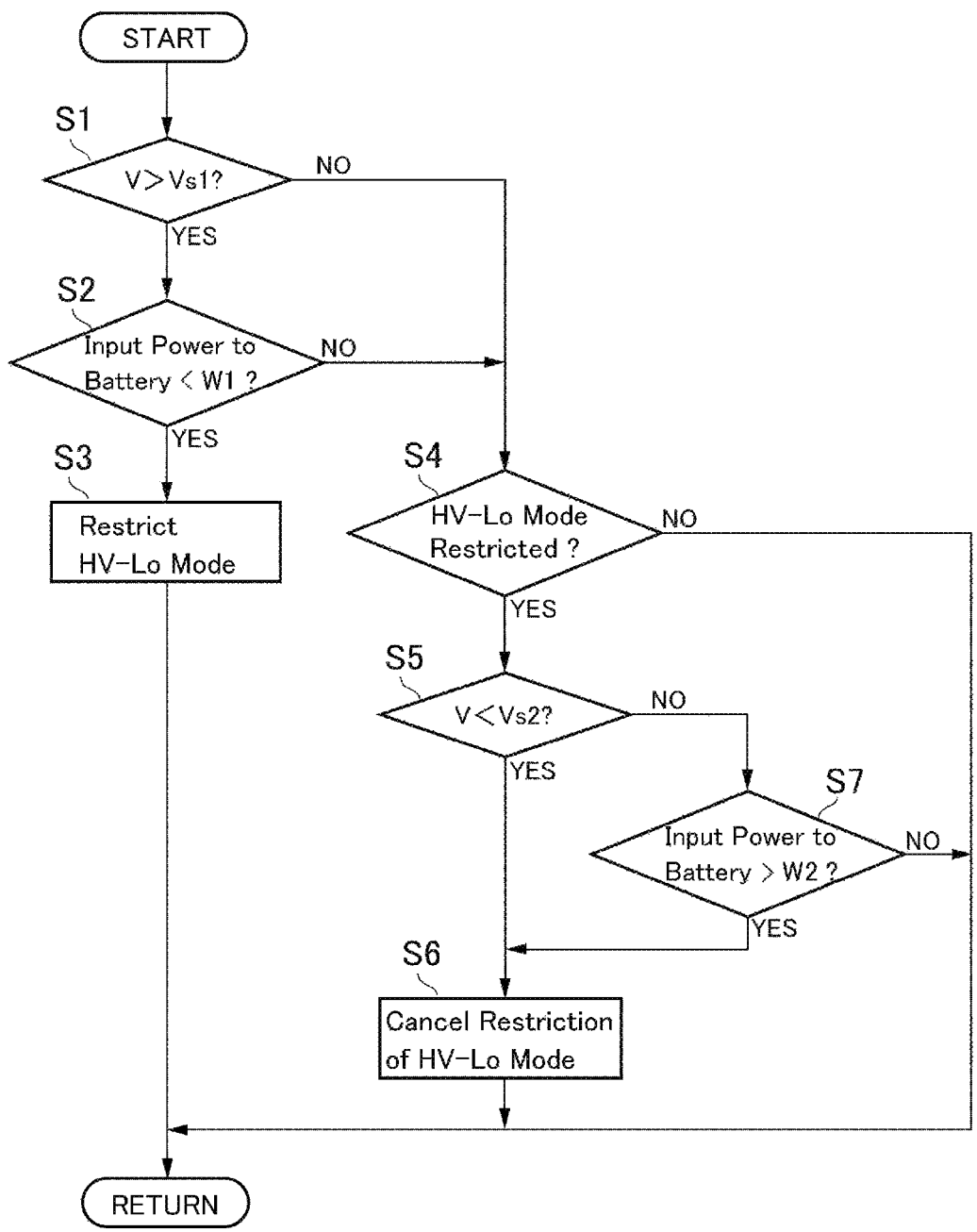
FIG. 18 is a flowchart showing one example of a routine executed by the control system according to the embodiment of the present disclosure.

In the routine shown in FIG. 18, steps S1 and S5 may be omitted. That is, the restriction of the HV-Lo mode may also be determined without reference to the vehicle speed. In this case, the routine progresses directly from step S4 to step S7 if the answer of step S4 is YES.

Figure 20:
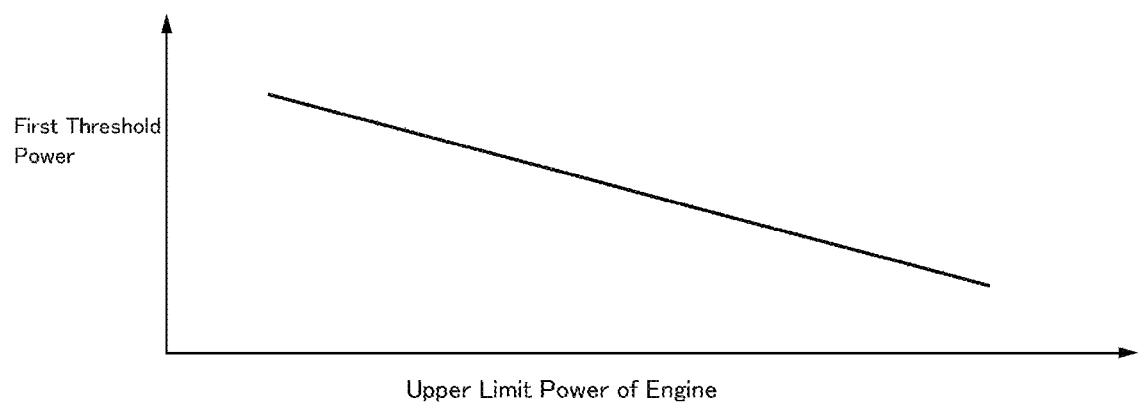
FIG. 20 is a graph showing a change in a first threshold power in accordance with a change in the upper limit power of the engine.

The power consumption of the first motor 6 is increased with an increase in the upper limit power (i.e., the brake power) of the engine 5. That is, even if the second motor 7 generates large amount of electric power, the electric power will not be supplied excessively to the battery 47 by consuming the electric power by the first motor 6. According to the embodiment, therefore, the first threshold power W1 may be reduced with an increase in the upper limit power of the engine 5 in the HV-Lo mode. To this end, the determination at step S2 may be made with reference to a map shown in FIG. 20. The map shown in FIG. 20 may be prepared based on a result of an experimentation or a simulation, and in FIG. 20, the horizontal axis represents the upper limit power of the engine 5 in the HV-Lo mode, and the vertical axis represents the first threshold power W1.

Figure 21:
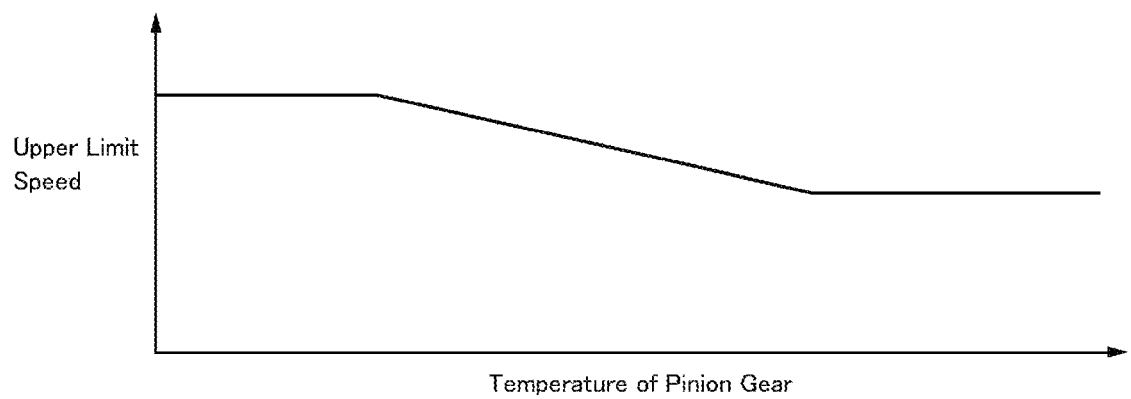
FIG. 21 is a graph showing an upper limit speed of a pinion gear in accordance with a change in a temperature of the pinion gear.
Figure 22:
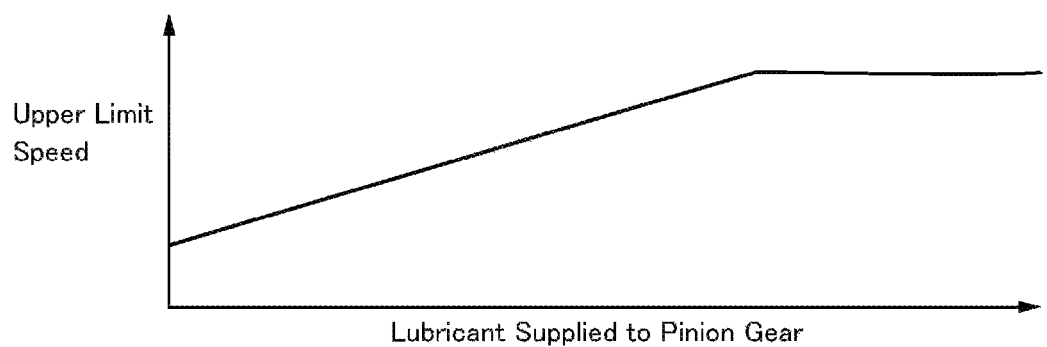
FIG. 22 is a graph showing the upper limit speed of the pinion gear in accordance with a change in an amount of lubricant applied to the pinion gear.

As described, the upper limit power of the engine 5 is set on the basis of the allowable speed of the pinion gear 13 as an upper limit speed at which the pinion gear 13 can be rotated without being damaged. Accordingly, as shown in FIG. 21, the allowable speed of the pinion gear 13 may be reduced with an increase in a temperature of the pinion gear 13. Instead, as shown in FIG. 22, the allowable speed of the pinion gear 13 may be increased with an increase in an amount of lubricant (i.e., oil) supplied to the pinion gear 13. By thus adjusting the allowable speed of the pinion gear 13, the output power of the engine 5 will not be restricted excessively to prevent shortage of the brake force. For this purpose, a temperature sensor may be arranged in the vicinity of the pinion gears 13 to measure a temperature of the pinion gears 13. Instead, the temperature of the pinion gear 13 may be estimated based on a magnitude of the torque applied to the pinion gear 13, or based on an oil temperature in the first drive unit 2.

As a result of restricting the selection of the HV-Lo mode by carrying out the routine shown in FIG. 18, it is possible to avoid a reduction in the maximum brake force due to selection of the HV-Hi mode and the fixed mode. However, a required brake force may not be achieved in the HV-Hi mode and the fixed mode. In order to avoid such disadvantage, it is preferable to promptly increase the input power allowed to accumulate in the battery 47. To this end, the control system according to the embodiment is further configured to execute a cancellation control to cancel the restriction of selection of the HV-Lo mode during restricting the selection of the HV-Lo mode.

Figure 23:
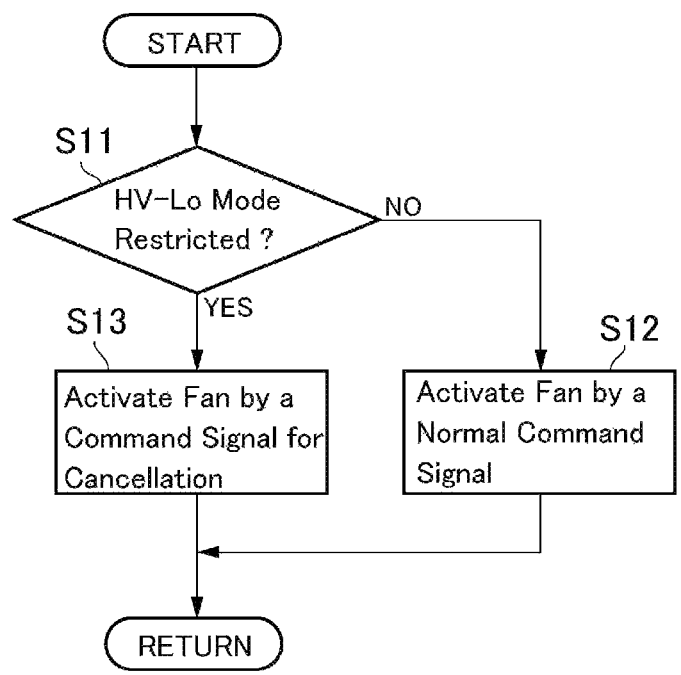
FIG. 23 is a flowchart showing one example of a routine to change a command signal to a cooling fan so as to increase an available output from the battery.

An example of the cancellation control is shown in FIG. 23. For example, the routine shown in FIG. 23 is commenced when the input power allowed to accumulate in the battery 47 is limited due to temperature rise in the battery 47. At step S11, it is determined whether or not the selection of the HV-Lo mode is restricted. Such determination at step S11 may be made by the same procedure as the determination at step S4 in the routine shown in FIG. 18.

If the selection of the HV-Lo mode is not restricted so that the answer of step S11 is NO, the routine progresses to step S12 to activate the cooling fan F based on a command signal for the normal control. Thereafter, the routine returns. By contrast, if the selection of the HV-Lo mode is restricted so that the answer of step S11 is YES, the routine progresses to step S13 to activate the cooling fan F based on a command signal for the cancellation control. Thereafter, the routine returns.

Figure 24:
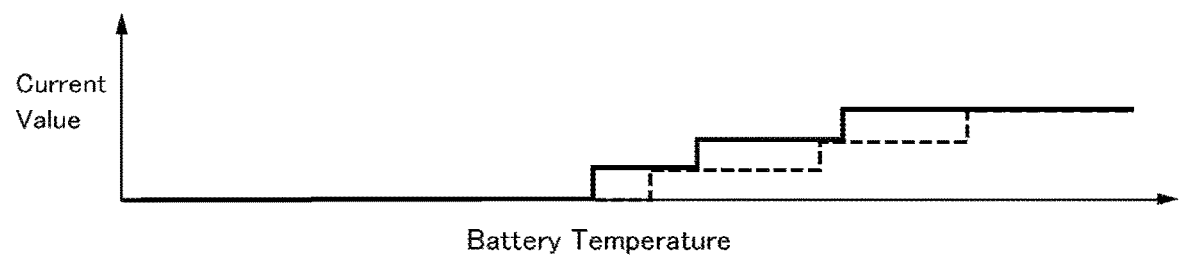
FIG. 24 is a graph showing a change in the command signal to the cooling fan in accordance with a current value.

An example of the command signal for activating the cooling fan F is shown in FIG. 24. In FIG. 14, the horizontal axis represents a temperature of the battery 47, the vertical axis represents a current value applied to the cooling fan F, the solid line represents a current value applied to the cooling fan F when carrying out the cancellation control, and the dashed line represents a current value applied to the cooling fan F in the normal condition. As shown in FIG. 24, in a case of carrying out the cancellation control, a relatively large current is applied to the cooling fan F from a relatively low temperature. In this case, therefore, the battery 47 can be cooled promptly to ease the limitation of the input power allowed to accumulate in the battery 47. In other words, the restriction of selection of the HV-Lo mode can be cancelled promptly. To this end, a water-cooling system may also be used instead of the cooling fan F. In this case, a flow rate of the water is increased when carrying out the cancellation control to cool the battery 47 promptly.

In addition, when the SOC level of the battery 47 is raised, the selection of the HV-Lo mode may also be restricted due to reduction in the input power allowed to accumulate in the battery 47. In order to avoid such disadvantage, it is preferable to promptly lower the SOC level of the battery 47. To this end, the control system according to the embodiment is further configured to execute another cancellation control shown in FIG. 25.

Figure 25:
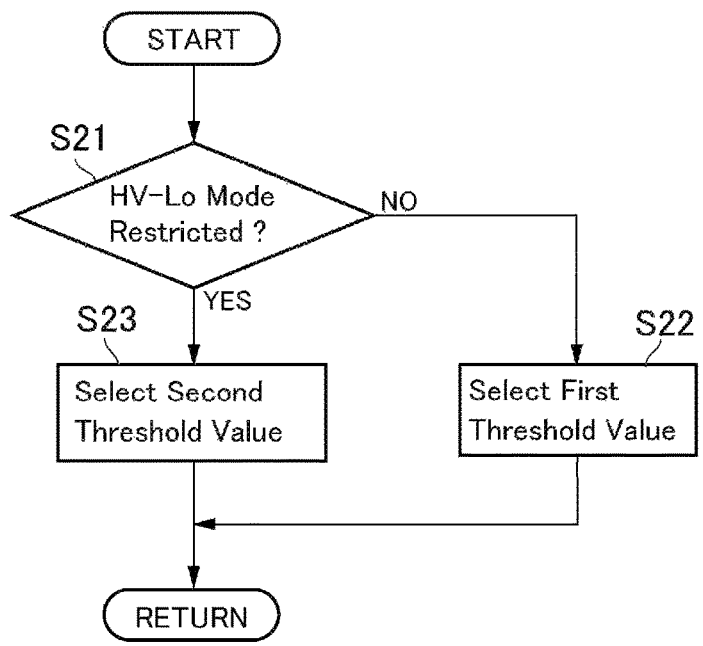
FIG. 25 is a flowchart showing one example of a routine to reduce a frequency to start the engine so as to increase the input power allowed to accumulate in the battery.

According to the cancellation control shown in FIG. 25, the SOC level of the battery 47 is lowered by reducing a frequency to start the engine 5. To this end, specifically, the engine 5 is stopped when a required power for the vehicle is large.

At step S21, it is determined whether or not the selection of the HV-Lo mode is restricted. Such determination at step S21 may be made by the same procedure as the determination at steps S4 and S11 in the foregoing routines. If the selection of the HV-Lo mode is not restricted so that the answer of step S21 is NO, the routine progresses to step S22 to select a first starting threshold value of the required power to start the engine 5 in the normal condition, and thereafter, the routine returns. By contrast, if the selection of the HV-Lo mode is restricted so that the answer of step S21 is YES, the routine progresses to step S23 to select a second starting threshold value of the required power to start the engine 5 that is greater than the first starting threshold value.

By thus reducing the frequency to start the engine 5 when the selection of the HV-Lo mode is restricted, the engine 5 will not be started frequently so that the SOC level of the battery 47 falls rapidly. Consequently, the limitation of the input power allowed to accumulate in the battery 47 may be eased. For this reason, the restriction of selection of the HV-Lo mode may be cancelled promptly.

Although the above exemplary embodiments of the present application have been described, it will be understood by those skilled in the art that the present application should not be limited to the described exemplary embodiments, and various changes and modifications can be made within the spirit and scope of the present application. For example, the hybrid vehicle according to the embodiment may be modified as long as two different operating modes can be selected to alter the ratio of the torque delivered to the first motor and to the output member, and the brake force derived from the regenerative torque of the second motor and the engine brake force can be applied to the drive wheels. Hereinafter, modification examples of the hybrid vehicle will be explained with reference to FIGS. 26 to 31. In the following explanation, common reference numerals are allotted to in common with those of the foregoing embodiment, and detailed explanation for the common elements will be omitted.

Figure 26:
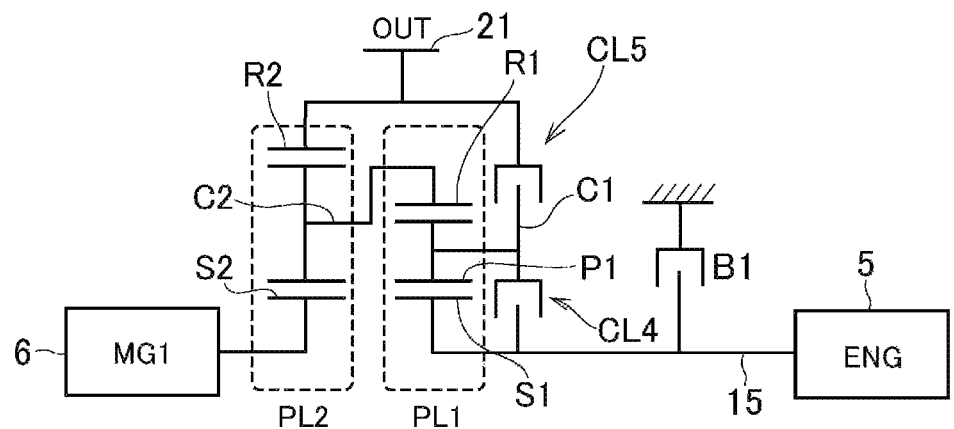
FIG. 26 is a skeleton diagram showing a structure of the hybrid vehicle according to another embodiment.

The hybrid vehicle shown in FIG. 26 comprises a first differential mechanism PL1 connected directly to the engine 5, and a second differential mechanism PL2 connected directly to the first motor 6.

The first differential mechanism PL1 is a single-pinion planetary gear unit comprising: a sun gear S1 formed around the output shaft 15 of the engine 5; a ring gear R1 arranged concentrically with the sun gear S1; pinion gears P1 interposed between the sun gear S1 and the ring gear R1 while being meshed with both gears S1 and R1; and a carrier C1 supporting the pinion gears P1 in a rotatable manner.

The second differential mechanism PL2 is also a single-pinion planetary gear unit comprising: a sun gear S2 connected to the first motor 6; a carrier C2 connected to the ring gear R1 of the first differential mechanism PL1; and a ring gear R2 connected to the output gear 21. The output gear 21 is meshed with the driven gear 23 to distribute the torque to the front wheels 1R and 1L.

In the first differential mechanism PL1, the sun gear S1 and the carrier C1 are engaged to each other through a fourth clutch CL4 to rotate the rotary elements of the first differential mechanism PL1 integrally. The carrier C1 of the first differential mechanism PL1 and the ring gear R2 of the second differential mechanism PL2 are engaged to each other through a fifth clutch CL5. The brake B1 is disposed on the output shaft 15 of the engine 5. For example, a friction clutch and a dog clutch may also be used individually as the clutches CL4 and CL5.

In the hybrid vehicle shown in FIG. 26, the HV-Lo mode in which the ratio of the torque delivered to the ring gear R2 is relatively large is established by engaging the fourth clutch CL4, and the HV-Hi mode in which the ratio of the torque delivered to the ring gear R2 is relatively small is established by engaging the fifth clutch CL5.

Figure 27:
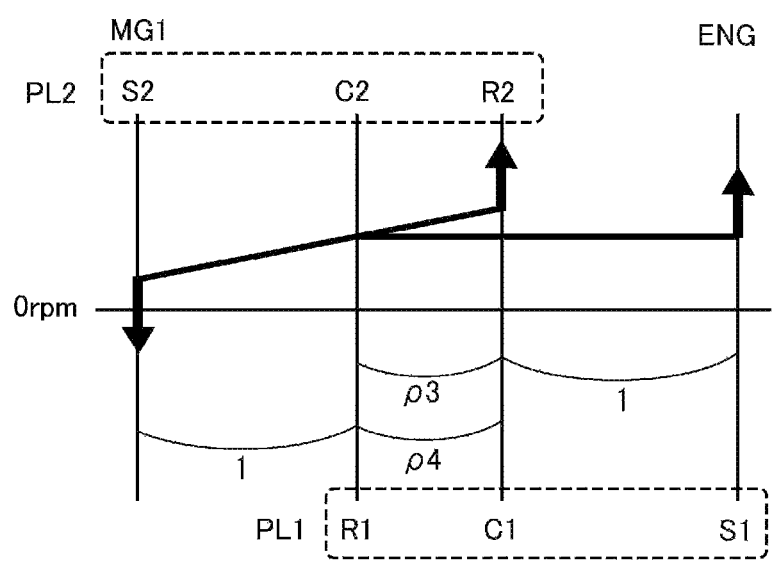
FIG. 27 is a nomographic diagram showing a situation of the hybrid vehicle shown in FIG. 26 in the HV-Hi mode.

FIG. 27 indicates rotational speeds of the rotary elements of the first differential mechanism PL1 and the second differential mechanism PL2 in the HV-Hi mode of the hybrid vehicle shown in FIG. 26. As shown in FIG. 27, the HV-Hi mode is established by engaging the fifth clutch CL5 so that the rotary elements in the first differential mechanism PL1 are rotated integrally. Consequently, the carrier C2 as an input element of the second differential mechanism PL2 is rotated at a same speed as the engine 5. In the HV-Hi mode, the sun gear S2 of the second differential mechanism PL2 is allowed to serve as a reaction element by applying reaction torque thereto from the first motor 6, and consequently the ring gear R2 of the second differential mechanism PL2 is allowed to serve as an output element to deliver the torque to the output gear 21. Given that the engine torque delivered to the first motor 6 side is "1", a ratio of the torque applied to the ring gear R2 in the HV-Hi mode may be expressed as "$1/\rho 4$". In the hybrid vehicle shown in FIG. 26, a ratio between teeth number of the ring gear R1 and teeth number of the sun gear S1 is "$\rho 3$", and a ratio between teeth number of the ring gear R2 and teeth number of the sun gear S2 is"$\rho 4$".

Figure 28:
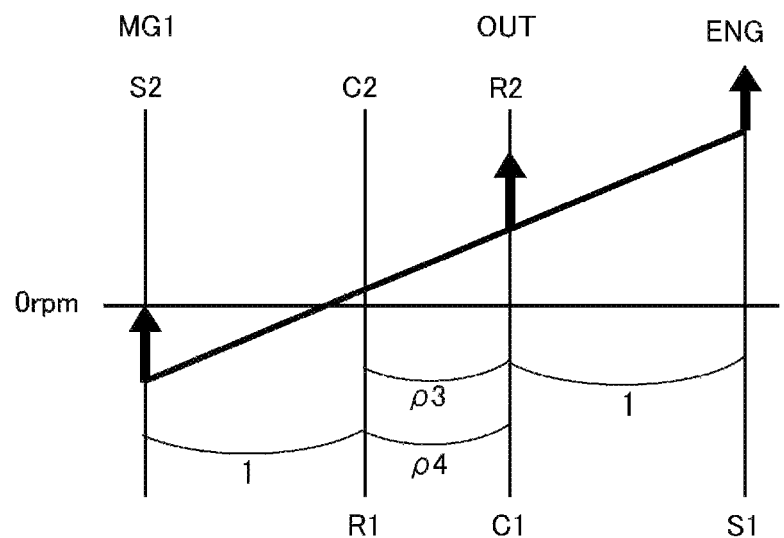
FIG. 28 is a nomographic diagram showing a situation of the hybrid vehicle shown in FIG. 26 in the HV-Lo mode.

FIG. 28 indicates rotational speeds of the rotary elements of the first differential mechanism PL1 and the second differential mechanism PL2 in the HV-Lo mode of the hybrid vehicle shown in FIG. 26. As shown in FIG. 27, the HV-Lo mode is established by engaging the fourth clutch CL4 so that the carrier C1 of the first differential mechanism PL1 and the ring gear R2 of the second differential mechanism PL2 are rotated integrally. In addition, the carrier C2 of the second differential mechanism PL2 is connected to the ring gear R1 of the first differential mechanism PL1. In the HV-Lo mode, therefore, the carrier C1 of the first differential mechanism PL1 serves as an input element, the sun gear S2 of the second differential mechanism PL2 serves as a reaction element, and the ring gear R2 of the second differential mechanism PL2 serves as an output element. In the HV-Lo mode, specifically, the torque of the sun gear S1 of the first differential mechanism PL1 is delivered to the rig gear R2 of the second differential mechanism PL2. In the HV-Lo mode, given that the engine torque delivered to the first motor 6 side is "1", a ratio of the engine torque delivered to the ring gear R2 may be expressed as "1+ρ3+(ρ3/ρ4)". Thus, in the HV-Lo mode, the ratio of the torque delivered from the engine 5 to the ring gear R2 is increased in comparison with that in the HV-Hi mode.

As described, in the hybrid vehicle shown in FIG. 26, the HV mode is established by engaging any one of the fourth clutch CL4 and the fifth clutch CL5. In addition, the ratio of the torque delivered from the engine 5 to the ring gear R2 in the HV-Lo mode is greater than that in the HV-Hi mode, and the upper limit speed of the engine 5 in the HV-Lo mode is lower than that in the HV-Hi mode. For these reasons, the maximum brake force may be reduced in the HV-Lo mode if the input power allowed to accumulate in the battery 47 is limited. In the hybrid vehicle shown in FIG. 26, therefore, it is preferable to restrict the selection of the HV-Lo mode when the input power allowed to accumulate in the battery 47 is limited.

Figure 29:
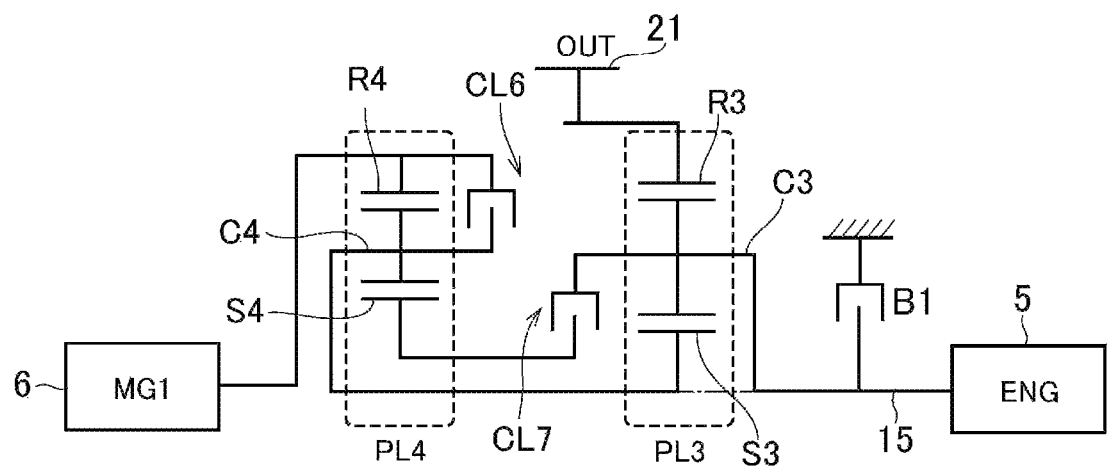
FIG. 29 is a skeleton diagram showing a structure of the hybrid vehicle according to still another embodiment.

The hybrid vehicle shown in FIG. 29 comprises a third differential mechanism PL3 connected directly to the engine 5, and a fourth differential mechanism PL4 connected directly to the first motor 6.

The third differential mechanism PL3 is also a single-pinion planetary gear unit comprising: a carrier C3 connected to the output shaft 15 of the engine 5; a sun gear S3; and a ring gear R3 connected to the output gear 21. The output gear 21 is also meshed with the driven gear 23 to distribute the torque to the front wheels 1R and 1L.

The fourth differential mechanism PL4 is also a single-pinion planetary gear unit comprising: a ring gear R4 connected to the first motor 6; a carrier C4 connected to the sun gear S3 of the third differential mechanism PL3; and a sun gear S4.

In the fourth differential mechanism PL4, the carrier C4 and the ring gear R4 are engaged to each other through a sixth clutch CL6 to rotate the rotary elements of the fourth differential mechanism PL4 integrally. The carrier C3 of the third differential mechanism PL3 and the sun gear S4 of the fourth differential mechanism PL4 are engaged to each other through a seventh clutch CL7. The brake B1 is also disposed on the output shaft 15 of the engine 5. For example, a friction clutch and a dog clutch may also be used individually as the clutches CL6 and CL7.

In the hybrid vehicle shown in FIG. 29, the HV-Lo mode in which the ratio of the torque delivered to the ring gear R3 is relatively large is established by engaging the sixth clutch CL6, and the HV-Hi mode in which the ratio of the torque delivered to the ring gear R3 is relatively small is established by engaging the seventh clutch CL7.

Figure 30:
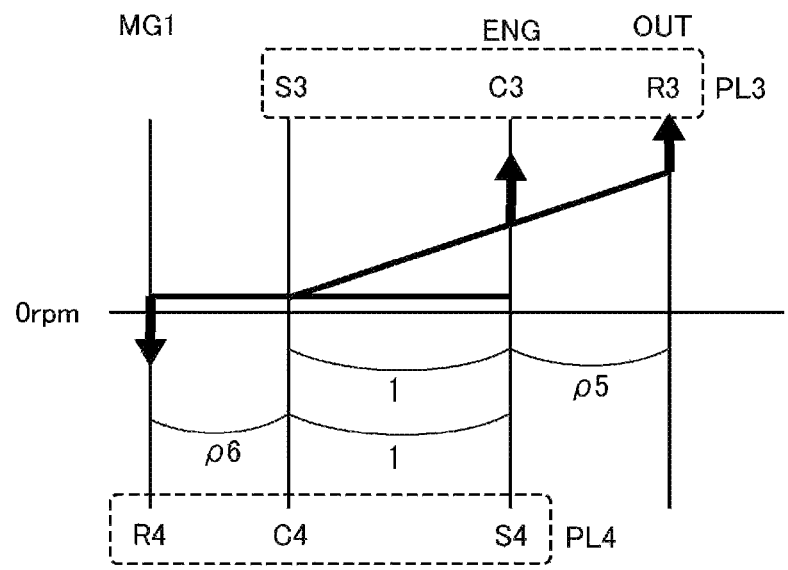
FIG. 30 is a nomographic diagram showing a situation of the hybrid vehicle shown in FIG. 29 in the HV-Hi mode.

FIG. 30 indicates rotational speeds of the rotary elements of the third differential mechanism PL3 and the fourth differential mechanism PL4 in the HV-Hi mode of the hybrid vehicle shown in FIG. 29. As shown in FIG. 30, the HV-Hi mode is established by engaging the sixth clutch CL6 so that the rotary elements in the fourth differential mechanism PL4 are rotated integrally. Consequently, the torque of the first motor 6 is delivered to the carrier C4 of the fourth differential mechanism PL4 without being changed. In the HV-Hi mode, torque of the engine 5 is applied to the carrier C3 of the third differential mechanism PL3 and reaction torque established by the first motor 6 is delivered to the sun gear S3 of the third differential mechanism PL3 through the carrier C4 of the fourth differential mechanism PL4. Consequently, the torque is delivered from the ring gear R3 to the output gear 21. Thus, in the HV-Hi mode, the carrier C3 serves as an input element, the sun gear S3 serves as a reaction element, and the ring gear R3 serves as an output element. In the hybrid vehicle shown in FIG. 29, given that the engine torque delivered to the first motor 6 side is "1", a ratio of the torque applied to the ring gear R3 in the HV-Hi mode may be expressed as "$1/\rho5$" where $\rho5$ is a ratio between teeth number of the ring gear R3 and teeth number of the sun gear S3.

Figure 31:
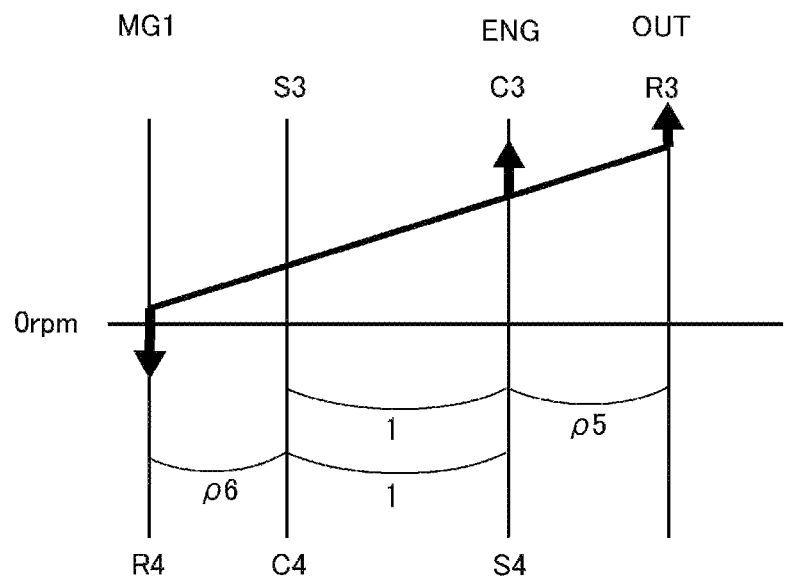
FIG. 31 is a nomographic diagram showing a situation of the hybrid vehicle shown in FIG. 29 in the HV-Lo mode.

FIG. 31 indicates rotational speeds of the rotary elements of the third differential mechanism PL3 and the fourth differential mechanism PL4 in the HV-Lo mode of the hybrid vehicle shown in FIG. 29. As shown in FIG. 31, the HV-Lo mode is established by engaging the seventh clutch CL7 so that the carrier C3 of the third differential mechanism PL3 and the sun gear S4 of the fourth differential mechanism PL4 are rotated integrally. In addition, the sun gear S3 of the third differential mechanism PL3 is connected to the carrier C4 of the fourth differential mechanism PL4. In the HV-Lo mode, therefore, the carrier C3 of the third differential mechanism PL3 serves as an input element, the ring gear R4 of the fourth differential mechanism PL4 serves as a reaction element, and the ring gear R3 of the third differential mechanism PL3 serves as an output element. In the HV-Lo mode, specifically, the torque of the carrier C3 of the third differential mechanism PL3 is delivered to the rig gear R3 of the third differential mechanism PL3. In the HV-Lo mode, given that the engine torque delivered to the first motor 6 side is "1", a ratio of the engine torque delivered to the ring gear R3 may be expressed as "$(1+\rho6)/\rho5$" where $\rho6$ is a ratio between teeth number of the ring gear R4 and teeth number of the sun gear S4. Thus, in the HV-Lo mode, the ratio of the torque delivered from the engine 5 to the ring gear R3 is increased in comparison with that in the HV-Hi mode. In addition, given that the rotational speed of the first motor 6 is "0", a speed reducing ratio between the rotational speeds of the engine 5 and the ring gear R3 in the HV-Lo mode is greater than that in the HV-Hi mode.

As described, in the hybrid vehicle shown in FIG. 29, the HV mode is established by engaging any one of the sixth clutch CL4 and the seventh clutch CL7. In addition, the ratio of the torque delivered from the engine 5 to the ring gear R3 in the HV-Lo mode is greater than that in the HV-Hi mode, and the upper limit speed of the engine 5 in the HV-Lo mode is lower than that in the HV-Hi mode. For these reasons, the maximum brake force may be reduced in the HV-Lo mode if the input power allowed to accumulate in the battery 47 is limited. In the hybrid vehicle shown in FIG. 29, therefore, it is also preferable to restrict the selection of the HV-Lo mode when the input power allowed to accumulate in the battery 47 is limited.

Thus, in the hybrid vehicles shown in FIGS. 1, 26, and 29, the first differential mechanism is adapted to perform a differential action among a first rotary element connected to an engine; a second rotary element connected to a motor; and a third rotary element connected to drive wheels. The second differential mechanism is also adapted to perform a differential action among: a fourth rotary element; a fifth rotary element connected to the third rotary element; and a sixth rotary element. Each of the hybrid vehicles individually comprises: a first engagement device that selectively connects the sixth rotary element to the first rotary element or the second rotary element; and a second engagement device that selectively connects any two of the first rotary element, the second rotary element, and the third rotary element, or connects any two of the fourth rotary element, the fifth rotary element, and the sixth rotary element. In the hybrid vehicles, a first mode (i.e., the HV-Lo mode) in which a torque distribution ratio is relatively large is established by engaging any one of the first engagement device and the second engagement device, and a second mode (i.e., the HV-Hi mode) in which a torque distribution ratio is relatively small is established by engaging other one of the first engagement device and the second engagement device.

What is claimed is:

1. A drive force control system for a hybrid vehicle, comprising:
    an engine;
    a first rotary machine that serves not only as a motor but also as a generator;
    a transmission mechanism that distributes an output torque of the engine to the first rotary machine side and an output member side, wherein an operating mode can be selected from a first mode in which a ratio of the output torque of the engine delivered to the output member side to a torque of the engine is set to a first predetermined ratio, and a second mode in which a ratio of the output torque of the engine delivered to the output member side to a torque of the engine is set to a second predetermined ratio that is smaller than the first predetermined ratio;
    a battery;
    a second rotary machine that serves not only as a motor but also as a generator, and that is connected electrically to the first rotary machine; and
    a controller to control the transmission mechanism,
    wherein the controller is configured to
    execute a regeneration control to deliver a regenerative torque resulting from operating the second rotary machine as a generator to the drive wheels, and an engine brake control to deliver a brake torque resulting from a power loss of the engine to the output member,
    maintain a rotational speed of the engine to a predetermined speed during execution of the engine brake control by operating the first rotary machine as a motor or a generator, and
    restrict selection of the first mode when an input power allowed to accumulate in the battery is smaller than a threshold power.

2. The drive force control system for a hybrid vehicle as claimed in claim 1, wherein the controller is further configured to:
    maintain the rotational speed of the engine to the predetermined speed during execution of the engine brake control by operating the first rotary machine as a motor; and
    supply an electric power calculated by subtracting an electric power consumed by the first rotary machine from an electric power generated by the second rotary machine during execution of the regeneration control to the battery.

3. The drive force control system for a hybrid vehicle as claimed in claim 1,
    wherein the engine comprises an intake pipe that introduces ambient air to the engine, and a throttle valve that controls a flow rate of the air flowing through the intake pipe, and
    the engine brake control includes a control to establish the brake torque by stopping fuel supply to the engine while controlling the throttle valve in such a manner as to reduce the flow rate of the air flowing through the intake pipe.

4. The drive force control system for a hybrid vehicle as claimed in claim 1, wherein the controller is further configured to establish a maximum brake force in the vehicle by maintaining the rotational speed of the engine to an upper limit speed by the first rotary machine, while controlling the regenerative torque of the second rotary machine based on the input power allowed to accumulate in the battery.

5. The drive force control system for a hybrid vehicle as claimed in claim 4, wherein the threshold power includes the input power allowed to accumulate in the battery, that is possible to reduce the maximum brake force in the first mode smaller than the maximum brake force in the second mode.

6. The drive force control system for a hybrid vehicle as claimed in claim 1, wherein the threshold power is reduced with an increase in the brake torque.

7. The drive force control system for a hybrid vehicle as claimed in claim 1,
    wherein the brake torque is increased with an increase in the rotational speed of the engine, and
    wherein the upper limit speed of the engine in the first mode is set to be lower than the upper limit speed of the engine in the second mode.

8. The drive force control system for a hybrid vehicle as claimed in claim 7, wherein the controller is further configured to control the first rotary machine in such a manner as to generate a larger electric power when maintaining the rotational speed of the engine to the upper limit speed in the first mode, in comparison with the electric power generated by the first rotary machine when maintaining the rotational speed of the engine to the upper limit speed in the second mode.

9. The drive force control system for a hybrid vehicle as claimed in claim 7,
    wherein the transmission comprises a plurality of rotary elements, and
    wherein the upper limit speed of the engine is raised with an increase in an upper limit speed of a predetermined rotary element in the rotary elements.

10. The drive force control system for a hybrid vehicle as claimed in claim 9,
    wherein the upper limit speed of the predetermined rotary element is lowered with a temperature rise of the predetermined rotary element, and
    wherein the upper limit speed of the predetermined rotary element is raised with an increase in an amount of lubricant supplied to the predetermined rotary element.

11. The drive force control system for a hybrid vehicle as claimed in claim 1, wherein the controller is further configured to restrict the selection of the first mode when a vehicle speed is higher than a predetermined speed.

12. The drive force control system for a hybrid vehicle as claimed in claim 1, wherein the controller is further configured to execute a cancellation control to cancel the restriction of selection of the first mode by increasing the input power allowed to accumulate in the battery during restricting the selection of the first mode.

13. The drive force control system for a hybrid vehicle as claimed in claim 12,
    wherein the input power allowed to accumulate in the battery is restricted when a temperature of the battery is raised higher than a predetermined temperature, wherein the drive force control system further comprises a cooling device, and wherein the cancellation control includes a control to cool the battery by the cooling device more promptly during restricting the selection of the first mode, in comparison with a case in which the selection of the first mode is not restricted.

14. The drive force control system for a hybrid vehicle as claimed in claim 12, wherein the controller is further configured to:

select an operating mode of the hybrid vehicle from a hybrid mode in which the hybrid vehicle is powered by the engine and the second rotary machine, and an electric vehicle mode in which the hybrid vehicle is powered by the second rotary machine without using the engine; and start the engine when a required power is greater than a predetermined power; and wherein the cancellation control includes a control to increase the predetermined power when the selection of the first mode is restricted, in comparison with a case in which the selection of the first mode is not restricted.

* * * * *